(12) United States Patent
Ishihara

(10) Patent No.: US 7,558,167 B2
(45) Date of Patent: Jul. 7, 2009

(54) TILT DETECTING APPARATUS AND METHOD, TILT CORRECTING APPARATUS HAVING THE SAME, AND INFORMATION RECORDING/REPRODUCING APPARATUS HAVING THE TILT CORRECTING APPARATUS

(75) Inventor: Kanji Ishihara, Saitama (JP)

(73) Assignee: Pioneer Corporation, Tokyo (JP)

( * ) Notice: Subject to any disclaimer, the term of this patent is extended or adjusted under 35 U.S.C. 154(b) by 831 days.

(21) Appl. No.: 11/170,090

(22) Filed: Jun. 30, 2005

(65) Prior Publication Data

US 2006/0002253 A1    Jan. 5, 2006

(30) Foreign Application Priority Data

Jun. 30, 2004   (JP)   ............... 2004-193432

(51) Int. Cl.
    G11B 7/085   (2006.01)
(52) U.S. Cl. ............... 369/44.32; 369/53.19
(58) Field of Classification Search ............... None
    See application file for complete search history.

(56) References Cited

U.S. PATENT DOCUMENTS

| | | | | |
|---|---|---|---|---|
| 6,137,754 | A * | 10/2000 | Furukawa et al. | 369/44.32 |
| 6,282,161 | B1 * | 8/2001 | Son et al. | 369/53.19 |
| 7,295,497 | B2 * | 11/2007 | Iljima et al. | 369/44.32 |
| 2003/0058771 | A1 * | 3/2003 | Furukawa et al. | 369/59.11 |
| 2003/0147314 | A1 * | 8/2003 | Kondo et al. | 369/44.32 |
| 2003/0223337 | A1 * | 12/2003 | Kimura et al. | 369/53.19 |
| 2004/0100894 | A1 * | 5/2004 | Ninomiya et al. | 369/125 |
| 2005/0201225 | A1 * | 9/2005 | Kase | 369/44.28 |

FOREIGN PATENT DOCUMENTS

| | | |
|---|---|---|
| JP | 09/320084 | 12/1997 |
| JP | 2002-288859 | 10/2002 |

* cited by examiner

Primary Examiner—Michael V. Battaglia
(74) Attorney, Agent, or Firm—Nixon & Vanderhye

(57) ABSTRACT

A tilt detecting apparatus is provided with: a first changing device for changing a focus position of laser light in a lamination direction of recording layers; a second changing device for changing the focus position in a radial direction of the information recording medium; and a tilt detecting device for detecting an amount of tilt, on the basis of a photo-detection signal. Its controlling device controls the first changing device to set the focus position onto one recording layer, controls the second changing device to displace the focus position to a j-th radial direction position (wherein j is a natural number) on the information recording medium, and controls the tilt detecting device to detect the j-th amount of tilt for the one recording layer. Then, it controls the first changing device to set the focus position onto another recording layer while the focus position is fixed at the j-th radial direction position and controls the tilt detecting device to detect the j-th amount of tilt for the another recording layer. Then, it controls the second changing device to displace the focus position to a j+1-th radial direction position on the information recording medium while the focus position is fixed on the another recording layer and controls the tilt detecting device to detect the j+1-th amount of tilt for the another recording layer.

17 Claims, 10 Drawing Sheets

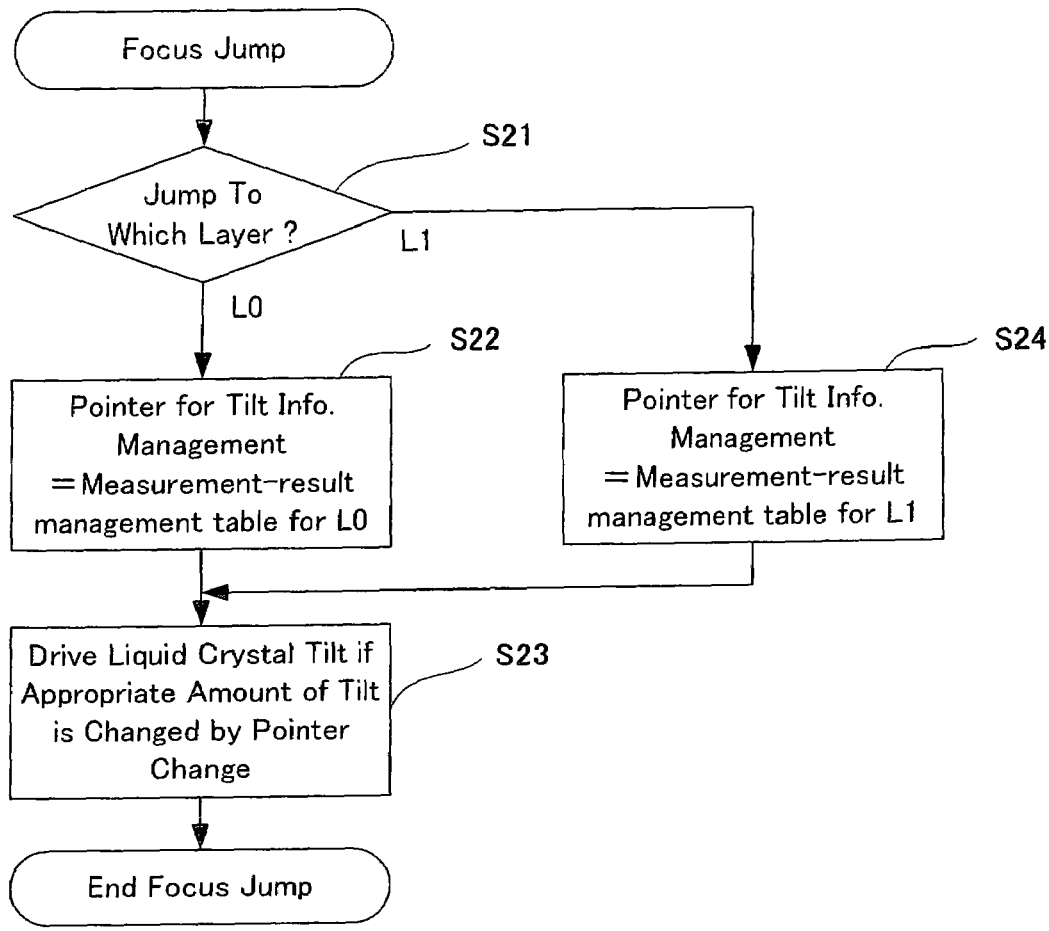
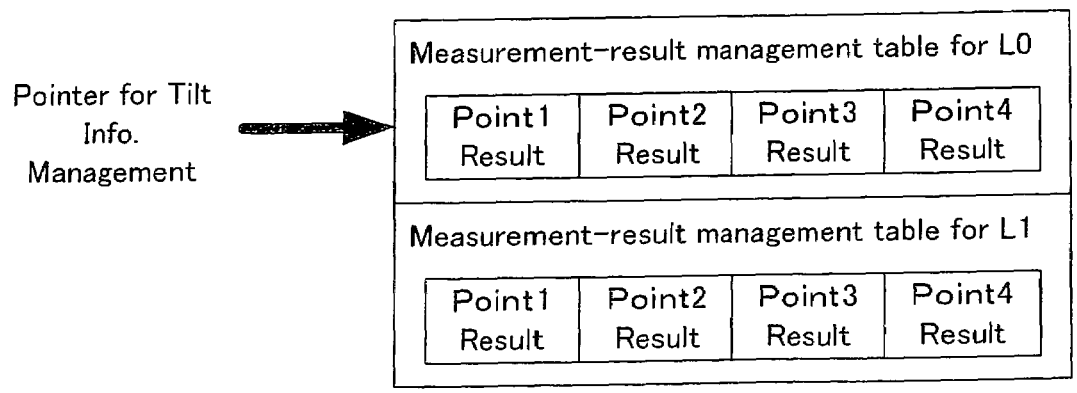

TILT DETECTING APPARATUS AND METHOD, TILT CORRECTING APPARATUS HAVING THE SAME, AND INFORMATION RECORDING/REPRODUCING APPARATUS HAVING THE TILT CORRECTING APPARATUS

BACKGROUND OF THE INVENTION

1. Field of the Invention

The present invention relates to a tilt detecting apparatus for and a tilt detecting method of detecting the amount of disc tilt (hereinafter merely referred to as the "amount of tilt") in an optical disc, such as a DVD-ROM, a DVD-RW and a DVD-RAM, a tilt correcting apparatus for and a tilt correcting method of making a tilt correction on the basis of the detected amount of tilt, an information reproducing apparatus, an information recording apparatus and an information recording/reproducing apparatus, such as a DVD player and a DVD recorder, including such a tilt correcting apparatus.

2. Description of the Related Art

On an information reproducing apparatus, such as a DVD player, it is extremely important to irradiate an optical disc which is set, such as a DVD, with laser light for reading, from a direction perpendicular to the recording surface of the optical disc, in order to optically read information, accurately. This is because the inclination, i.e., "tilt" of the information recording surface of the optical disc, such as a DVD, to the laser light deteriorates a reproduction signal, depending on the amount of tilt (i.e., a tilt amount or a tilt angle) as being the extent of the inclination, or the angle of tilt. Thus, conventionally, on a read-only optical disc, such as a DVD-ROM, the amount of tilt of the information recording surface is detected by using the amplitude of a Radio Frequency (RF) signal, which is detected in accordance with the presence of record information (i.e. recording pits).

Moreover, the amount of tilt is not constant in the plane of an information recording surface, so that the amount of tilt is detected at a plurality of reading points which has a different radial direction position, in order to obtain the in-plane distribution of the amount of tilt. As described above, obtaining the in-plane distribution of the amount of tilt is referred to as a "disc profile measurement" or simply as a "profile" or "profiling". Then, at the time of actual reproduction of the record information, the irradiation angle of the laser light is fine-tuned at each reading position so as to cancel the amount of tilt (which is referred to as a "tilt correction" herein as occasion demands) with respect to the information recording surface; namely, the laser irradiation angle to the information recording surface is set so as to increase the amplitude of the RF signal, to thereby prevent the deterioration of the reproduction signal by tilt.

On the other hand, even an information recording apparatus or an information recording/reproducing apparatus, such as a DVD recorder, at the time of recording, it is extremely important to irradiate an optical disc with laser light for writing, from a direction perpendicular to the information recording surface of the optical disc, in order to optically write information. This is because the presence of tilt causes a large light spot to be formed on the information recording surface, depending on the amount of tilt, to thereby deteriorate a writing signal. In this case, if the writable disc, such as a DVD+RW, is unrecorded, it is impossible to detect the RF signal corresponding to the record information, as in the above-mentioned DVD-ROM or the like. Thus, in place of the RF signal, the amplitude of a tracking error signal which uses land/groove tracks is used for the detection of the amount of tilt. For example, in reproducing the information on an optical disc in a wobble land pre-pit manner, the vertical asymmetry of a RF difference signal (i.e. the tracking error signal) and the vertical asymmetry of a land pre-pit signal can be used, to thereby detect the amount of tilt (e.g. refer to Japanese Patent Application Laid Open NO. 2002-288859).

Moreover, even for a two-layer disc or a multilayer disc in which two or a plurality of recording layers are laminated, a technique of performing such a tilt detection on any of the recording layers (hereinafter referred to as a "related art", as occasion demands) has been proposed. According to the related art, the tilt detection can be performed for a desired recording layer, by removing stray light due to reflection from another recording layer out of the plurality of recording layers (e.g. refer to Japanese Patent Application Laid Open NO. Hei 9-320084).

According to the findings of the inventors of the present invention, the disc profile in the two-layer disc or the multilayer disc is normally not the same among the plurality of recording layers. In other words, the thickness of the recording layer is not constant or not uniform in the plane of the disc.

Therefore, only the tilt detection for the desired recording layer out of the plurality of recording layers, as in the above-mentioned related art, is not enough to make an optimum tilt correction for each of the plurality of recording layers. Moreover, in the above-mentioned related art, it is assumed that the disc profile measurement is performed for one recording layer, by focusing laser light on the one recording layer of the two-layer disc and that the disc profile measurement is performed for the other recording layer, by focusing the laser light on the other recording layer. If a time required for the disc profile measurement for one recording layer is a time "Δt", which is about several seconds, for example, then, a time required for the disc profile measurement for a plurality of "n" recording layers is Δt×n or more, for example. Furthermore, in the disc profile measurement for one recording layer, normally, the tilt detection is performed at a plurality of measurement points while an optical pickup is displaced from the inner to the outer circumferential side of the optical disc. Thus, after all, the time required for the disc profile measurement for the plurality of "n" recording layers is Δt×n+"a time required for returning the optical pickup from the outer to the inner circumferential side"×n or more. Namely, if the disc profile measurement on the two-layer disc or the multilayer disc is performed for each recording layer, it takes time in proportion to the total number "n" of the recording layers, or it takes longer than proportional to the total number "n". As described above, in the two-layer disc or the multilayer disc, there is such a technical problem that it is extremely difficult to perform the tilt detection and the disc profile measurement, accurately and quickly.

SUMMARY OF THE INVENTION

It is therefore an object of the present invention to provide: a tilt detecting apparatus and a tilt detecting method which can perform the tilt detection and the disc profile measurement, accurately and quickly, for each of the plurality of recording layers on the two-layer disc or the multilayer disc, a tilt correcting apparatus provided with the tilt detecting apparatus, an information reproducing apparatus, an information recording apparatus, and an information recording/reproducing apparatus provided with the tilt correcting apparatus.

(Tilt Detecting Apparatus)

The above object of the present invention can be achieved by a first tilt detecting apparatus for performing tilt detection of an information recording medium, in which a plurality of recording layers are laminated and which has a disc shape, in an information reproducing apparatus, an information recording apparatus, or an information recording/reproducing apparatus, which can perform at least one of reproduction and recording of record information as for each of the recording layers, by irradiating the information recording medium with laser light, the tilt detecting apparatus provided with: a first changing device for changing a focus position of the laser light in a lamination direction of the recording layers; a second changing device for changing the focus position in a radial direction of the information recording medium; a tilt detecting device for detecting an amount of tilt of the information recording medium with respect to the laser light, on the basis of a photo-detection signal of light from the information recording medium caused by the laser light; and a controlling device for (i) controlling the first changing device to set the focus position onto one recording layer out of the recording layers, controlling the second changing device to displace the focus position to a j-th radial direction position (wherein j is a natural number) on the information recording medium, and controlling the tilt detecting device to detect the j-th amount of tilt for the one recording layer, then, (ii) controlling the first changing device to set the focus position onto another recording layer out of the recording layers while the focus position is fixed at the j-th radial direction position and controlling the tilt detecting device to detect the j-th amount of tilt for the other recording layer, then, (iii) controlling the second changing device to displace the focus position to a j+1-th radial direction position on the information recording medium while the focus position is fixed on the other recording layer and controlling the tilt detecting device to detect the j+1-th amount of tilt for the other recording layer, and then, (iv) controlling the first changing device to set the focus position onto the one recording layer while the focus position is fixed at the j+1-th radial direction position and controlling the tilt detecting device to detect the j+1-th amount of tilt for the one recording layer.

According to the first tilt detecting apparatus, the "information recording medium" is of a read-only type, such as a DVD-ROM, of an irreversible change recording type, such as a DVD-R, which uses heating, or of a writable type, such as a DVD-RW and a DVD-RAM, which uses phase change or optical magnetism, for example. On the information recording medium, tracks, such as groove tracks and land tracks, which are already recorded are formed in each recording layer. Moreover, the "laser light" is emitted from a semiconductor laser light source, for example, and selectively focused on each of the recording layers through an optical system, such as a beam splitter and an objective lens.

In the operation, at first, before the record information is actually reproduced or recorded on the information reproducing apparatus, the information recording apparatus, or the information recording/reproducing apparatus, such as a DVD player and a DVD recorder, the amount of tilt is detected for each recording layer and for each radial direction position in the following manner, under the control of the controlling device, such as a CPU.

Namely, at first, by the first changing device, such as a focusing mechanism related to an optical pickup, for example, the focus position is set onto one recording layer, for example, a L0 layer which is the closest as viewed from the irradiation side of the laser light. Before or after this, by the second changing device, such as a slider mechanism related to an optical pickup, for example, the focus position is displaced to the j-th radial direction position on the information recording medium. In this state, by the tilt detecting device which detects the amount of tilt by using a RF signal, a tracking error signal, a wobble signal, a pre-pit signal, etc., the j-th amount of tilt for the one recording layer is detected.

Then, by the first changing device, the focus position is set onto another recording layer, for example, a L1 layer which is the second closest as viewed from the irradiation side of the laser light, while the focus position is fixed at the j-th radial direction position i.e., without displacement of the optical pickup by the second changing device, such as a slider mechanism. Namely, the focus jump by focus driving is performed, for example. In this state, by the tilt detecting device, the j-th amount of tilt for the other recording layer is detected. For example, the amount of tilt is detected at a measurement position which is the closest to the inner circumferential side in the L1 layer.

Then, by the second changing device, the focus position is displaced to the j+1 radial direction position, which is relatively far from the inner circumferential side, while the focus position is fixed on the other recording layer, i.e. without the focus jump by the first changing device, such as a focus mechanism. Namely, the track jump by slider driving is performed, for example. In this state, by the tilt detecting device, the j+1-th amount of tilt for the other recording layer is detected. For example, the amount of tilt is detected at a measurement position which is relatively far in the L1 layer.

Then, by the first changing device, the focus position is set onto the one recording layer while the focus position is fixed at the j+1-th radial direction position. Namely, the focus jump by focus driving is performed, for example. In this state, by the tilt detecting device, the j+1-th amount of tilt for the one recording layer is detected. For example, the amount of tilt is detected at a measurement position which is relatively far from the inner circumferential side in the L0 layer.

As described above, by alternately performing the displacement in the lamination direction by the first changing device and the displacement in the radial direction by the second changing device, it is possible to detect the amount of tilt at the plurality of radial direction positions in each of the recording layers. Then, by totalizing the amount of tilt detected in this manner, for each of the recording layers, the in-plane distribution of the amount of tilt for each of the recording layers can be obtained. Namely, it is possible to perform the disc profile measurement, accurately and quickly in the end. Particularly here, with respect to the two or more recording layers, the disc profile measurement about at least two layers can be performed, accurately and quickly.

As described above, if the disc profile measurement is performed for each of the plurality of recording layers by using the related art, the required time is $\Delta t \times n +$"a time required for returning the optical pickup from the outer to the inner circumferential side"$\times n$ or more (wherein $\Delta t$: a time required for the disc profile measurement for one recording layer, n: the total number of recording layers). As compared to this, according to the first tilt detecting device, it is possible to detect the amount of tilt which is required only for the disc profile measurement, in an extremely short time. As a result, it is possible to obtain the disc profile, quickly.

The above object of the present invention can be also achieved by a second tilt detecting apparatus for performing tilt detection of an information recording medium, in which three or more recording layers are laminated and which has a disc shape, in an information reproducing apparatus, an information recording apparatus, or an information recording/reproducing apparatus, which can perform at least one of reproduction and recording of record information as for each of the recording layers, by irradiating the information recording medium with laser light, the tilt detecting apparatus provided with: a first changing device for changing a focus position of the laser light in a lamination direction of the recording layers; a second changing device for changing the focus position in a radial direction of the information recording medium; a tilt detecting device for detecting an amount of tilt of the information recording medium with respect to the laser light, on the basis of a photo-detection signal of light from the information recording medium caused by the laser light; and a controlling device for (i) controlling the first changing device to set the focus position onto one recording layer out of the recording layers, controlling the second changing device to displace the focus position to a j-th radial direction position (wherein j is a natural number) on the information recording medium, and controlling the tilt detecting device to detect the j-th amount of tilt for the one recording layer, then, (ii) controlling the first changing device to sequentially set the focus position onto each of other recording layers out of the recording layers while the focus position is fixed at the j-th radial direction position and controlling the tilt detecting device to sequentially detect the j-th amount of tilt for each of the other recording layers, then, (iii) controlling the second changing device to displace the focus position to a j+1-th radial direction position on the information recording medium while the focus position is fixed on a n-th recording layer (wherein n is the total number of the recording layers) in which the j-th amount of tilt is detected at last, out of the other recording layers, and controlling the tilt detecting device to detect the j+1-th amount of tilt for the n-th recording layer, and then, (iv) controlling the first changing device to sequentially set the focus position onto each of the recording layers other than the n-th recording layer while the focus position is fixed at the j+1-th radial direction position and controlling the tilt detecting device to sequentially detect the j+1-th amount of tilt for each of the recording layers other than the n-th recording layer.

According to the second tilt detecting apparatus, as in the case of the above-mentioned first tilt detecting apparatus, the displacement in the lamination direction by the first changing device and the displacement in the radial direction by the second changing device are alternately performed. According to the second tilt detecting apparatus, particularly, the focus position is changed by the first chancing device among the three or more recording layers; for example, the focus jump is performed among the three or more recording layers at the same radial direction position. Then, at the same radial direction position, the amount of tilt for each of the recording layers is detected at each time of this change. Therefore, it is possible to detect the amount of tilt at the plurality of radial direction positions in each of the three or more recording layers. Then, by totalizing the amount of tilt detected in this manner, for each of the recording layers, the in-plane distribution of the amount of tilt for each of the three or more recording layers can be obtained. Namely, it is possible to perform the disc profile measurement, related to each of the three or more recording layers, accurately and quickly in the end.

Incidentally, in the second tilt detecting device, in performing the displacement in the radial direction by the second changing device, the focus position in the lamination direction may be alternately on the closest (or front) recording layer and the farthest (or rear) recording layer. In this case, it is possible to minimize the summation of the displacement distance in the radial direction and the lamination direction of the focus position. In the displacement in the radial direction, the focus position may be always on the front recording layer or always on the rear recording layer. Alternatively, the focus position may be on an arbitral recording layer at each time of the displacement in the radial direction. By the displacement in the radial direction after the tilt amount is detected at the same measurement point in all the recording layers, the number of times of displacement and the distance in the radial direction can be reduced more or less, as compared to the related art. Thus, it is possible to properly obtain an advantage for the reduction of time related to the detection of the amount of tilt and the disc profile measurement in a comprehensive way.

In one aspect of the first or second tilt detecting apparatus, it is further provided with a processing device for outputting a discrete disc profile for each of the recording layers by totalizing the detected amount of tilt for each of the recording layers.

According to this aspect, by the processing device, the discrete disc profile for each of the recording layers is outputted by totalizing the detected amount of tilt for each of the recording layers. It is difficult to use the data of the amount of tilt detected by the tilt detecting device, as it is, as the disc profile for each of the recording layers, since the detection order is complicated. However, according to this aspect, the disc profile for each recording layer can be automatically obtained by the totalization by the processing device, so that it can be said that it is possible to perform the disc profile measurement, more easily and quickly.

Alternatively, in another aspect of the first or second tilt detecting apparatus, it is further provided with a processing device for calculating a continuous disc profile for each of the recording layers, on the basis of a discrete disc profile for each of the recording layers, which is obtained by totalizing the detected amount of tilt for each of the recording layers.

According to this aspect, by the processing device, the continuous disc profile for each of the recording layers is calculated, on the basis of the discrete disc profile for each of the recording layers, which is obtained by totalizing the detected amount of tilt for each of the recording layers. For example, the continuous disc profile over the whole surface of the information recording medium is obtained for each of the recording layers, by interpolation processing, approximation processing to a predetermined function (e.g. a curve of i-th degree) or the like, with respect to the discrete disc profile. It is difficult to use the data of the amount of tilt detected by the tilt detecting device, as it is, as the disc profile for each of the recording layers, since the detection order is complicated. However, according to this aspect, the continuous disc profile for each recording layer can be automatically obtained by the calculation by the processing device, so that it can be said that it is possible to perform the disc profile measurement, more easily and quickly.

In another aspect of the first or second tilt detecting apparatus, a spiral or coaxial recording track, on which the record information is recorded and to which an address is given, is formed on each of the recording layers, and the second changing device searches for an address corresponding to the j-th or the j+1-th radial direction position, to thereby displace the focus position to the j-th or the j+1-th radial direction position, under the control of the controlling device.

According to this aspect, by searching for the address, it is possible to displace the focus position to a recording point which is the object of the tilt detection by the tilt detecting device, quickly and certainly. For example, if the desired radial direction position, which is the object of the tilt detection appropriate for the disc profile measurement, is converted to the address in advance, it is possible to displace the focus position to the desired radial direction position, quickly, by searching for the converted address.

In another aspect of the first or second tilt detecting apparatus, it is further provided with: a management-table generating device for generating a management table onto which a disc profile for each of the recording layers is outputted, by totalizing tilt-amount information which indicates the detected amount of tilt, for each of the radial direction positions and for each of the recording layers; and a storing device for storing the generated management table.

According to this aspect, the detection result by the tilt detecting device is stored in the storing device in a form of the management table generated by the management-table generating device. Thus, later, by referring to the management table, it is possible to make a tilt correction, accurately and quickly.

(Tilt Detecting Method)

The above object of the present invention can be also achieved by a tilt detecting method of performing tilt detection of an information recording medium, in which a plurality of recording layers are laminated and which has a disc shape, in an information reproducing apparatus, an information recording apparatus, or an information recording/reproducing apparatus, which can perform at least one of reproduction and recording of record information as for each of the recording layers, by irradiating the information recording medium with laser light, the tilt detecting method being performed on a tilt detecting apparatus provided with: a first changing device for changing a focus position of the laser light in a lamination direction of the recording layers; a second changing device for changing the focus position in a radial direction of the information recording medium; and a tilt detecting device for detecting an amount of tilt of the information recording medium with respect to the laser light, on the basis of a photo-detection signal of light from the information recording medium caused by the laser light, the tilt detecting method provided with: a first controlling process of controlling the first changing device to set the focus position onto one recording layer out of the recording layers, controlling the second changing device to displace the focus position to a j-th radial direction position (wherein j is a natural number) on the information recording medium, and controlling the tilt detecting device to detect the j-th amount of tilt for the one recording layer; a second controlling process, which follows the first controlling process, of controlling the first changing device to set the focus position onto another recording layer out of the recording layers while the focus position is fixed at the j-th radial direction position and controlling the tilt detecting device to detect the j-th amount of tilt for the other recording layer; a third controlling process, which follows the second controlling process, of controlling the second changing device to displace the focus position to a j+1-th radial direction position on the information recording medium while the focus position is fixed on the other recording layer and controlling the tilt detecting device to detect the j+1-th amount of tilt for the other recording layer; and a fourth controlling process, which follows the third controlling process, of controlling the first changing device to set the focus position onto the one recording layer while the focus position is fixed at the j+1-th radial direction position and controlling the tilt detecting device to detect the j+1-th amount of tilt for the one recording layer.

According to the tilt detecting method, as in the case of the first tilt detecting apparatus, it is possible to perform the tilt detection and the disc profile measurement, accurately and quickly.

Incidentally, in response to various aspects in the above-mentioned first tilt detecting apparatus of the present invention, the tilt detecting method of the present invention can also adopt various aspects.

In addition, it is possible to construct a tilt detecting method corresponding to the second tilt detecting apparatus of the present invention. In this case, in response to various aspects in the second tilt detecting apparatus of the present invention, the tilt detecting method of the present invention can also adopt various aspects.

(Tilt Correcting Apparatus)

The above object of the present invention can be also achieved by a first tilt correcting apparatus provided with: the first or second tilt detecting apparatus of the present invention (including its various aspects); and a correcting device for correcting an irradiation angle of the laser light with respect to the information recording medium, in accordance with the detected amount of tilt.

According to the first tilt correcting apparatus, it is possible to make a tilt correction, quickly and highly accurately, by using the amount of tilt of the disc profile for each of the recording layers. For example, the irradiation angle of the laser light is slightly changed by the correcting device, such as a liquid crystal correction element, in accordance with the amount of tilt.

The above object of the present invention can be also achieved by a second tilt correcting apparatus provided with: the first or second tilt detecting apparatus, provided with: the management-table generating device and the storing device; and a correcting device for correcting an irradiation angle of the laser light with respect to the information recording medium, in accordance with the amount of tilt indicated by the tilt-amount information which is obtained by referring to the management table stored in the storing device.

According to the second tilt correcting apparatus, it is possible to make a tilt correction, quickly and highly accurately, by referring to the management table stored in the storing device, such as a memory of the controlling device.

(Information Recording/Reproducing Apparatus)

The above object of the present invention can be also achieved by an information recording/reproducing apparatus provided with: the first or second tilt correcting apparatus of the present invention (including its various aspects); and an optical writing/reading device which has an emitting device for emitting the laser light and which selectively writes the record information onto or reads the record information from the information recording medium by using the laser light.

According to the information recording/reproducing apparatus, it is provided with the first or second tilt correcting apparatus of the present invention. Thus, the record information can be written by the optical writing/reading device including an optical pickup, for example, while a tilt correction is made, quickly and highly accurately. Moreover, the record information can be read by the optical writing/reading device including an optical pickup, for example, while a tilt correction is made, quickly and at higher accuracy.

Incidentally, the first or second tilt correcting apparatus can be applied not only to the information recording/reproducing apparatus but also to an information reproducing apparatus, such as a DVD player, and to a record-only information recording apparatus, in the same manner.

As explained in detail above, according to the first or second tilt detecting device, it is provided with: the first changing device; the second changing device; the tilt detecting device; and the controlling device. According to the tilt detecting method, it is provided with the first to fourth controlling processes. Thus, it is possible to perform the tilt detection and the disc profile measurement, accurately and quickly. According to the first or second tilt correcting apparatus, it is provided with the first or second tilt detecting apparatus, so that it is possible to make a tilt correction, quickly and highly accurately. Moreover, according to the information recording/reproducing apparatus, it is provided with the tilt correcting apparatus, so that it is possible to write and read the record information while a tilt correction is made, quickly and highly accurately.

The nature, utility, and further features of this invention will be more clearly apparent from the following detailed description with reference to preferred embodiments of the invention when read in conjunction with the accompanying drawings briefly described below.

BRIEF DESCRIPTION OF THE DRAWINGS

FIG. 12 is a flowchart showing a tilt correction operation in performing focus jump at the time of recording or reproduction, in a second embodiment;

FIG. 13 is a conceptual diagram conceptually showing a measurement-result management table which is referred to in performing the focus jump in the second embodiment.

DETAILED DESCRIPTION OF THE PREFERRED EMBODIMENTS

The embodiments of the present invention will be explained with reference to the drawings hereinafter.

First Embodiment

Figure 1:
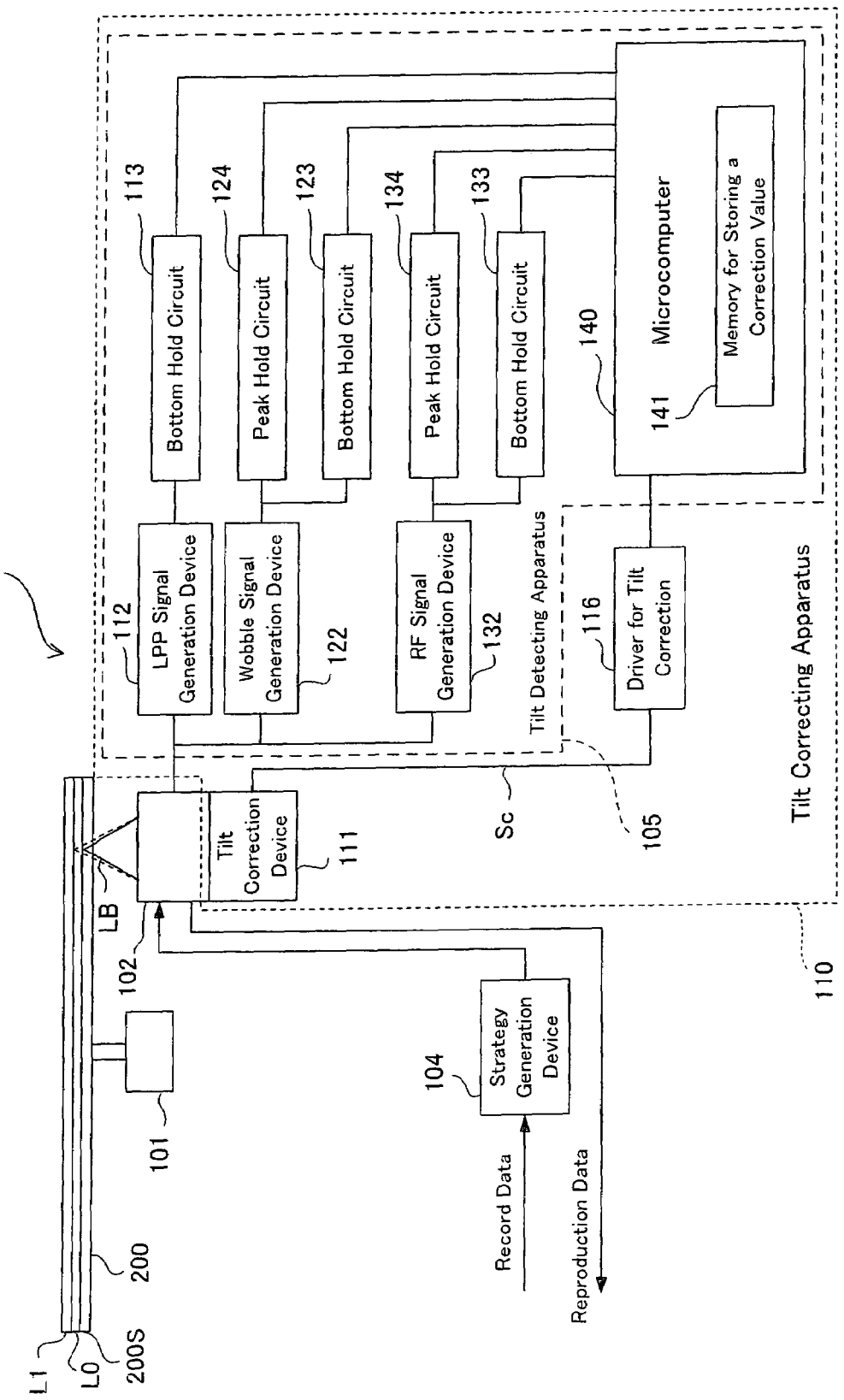
FIG. 1 is a block diagram showing a whole information recording/reproducing apparatus according to a first embodiment of the present invention.
Figure 2:
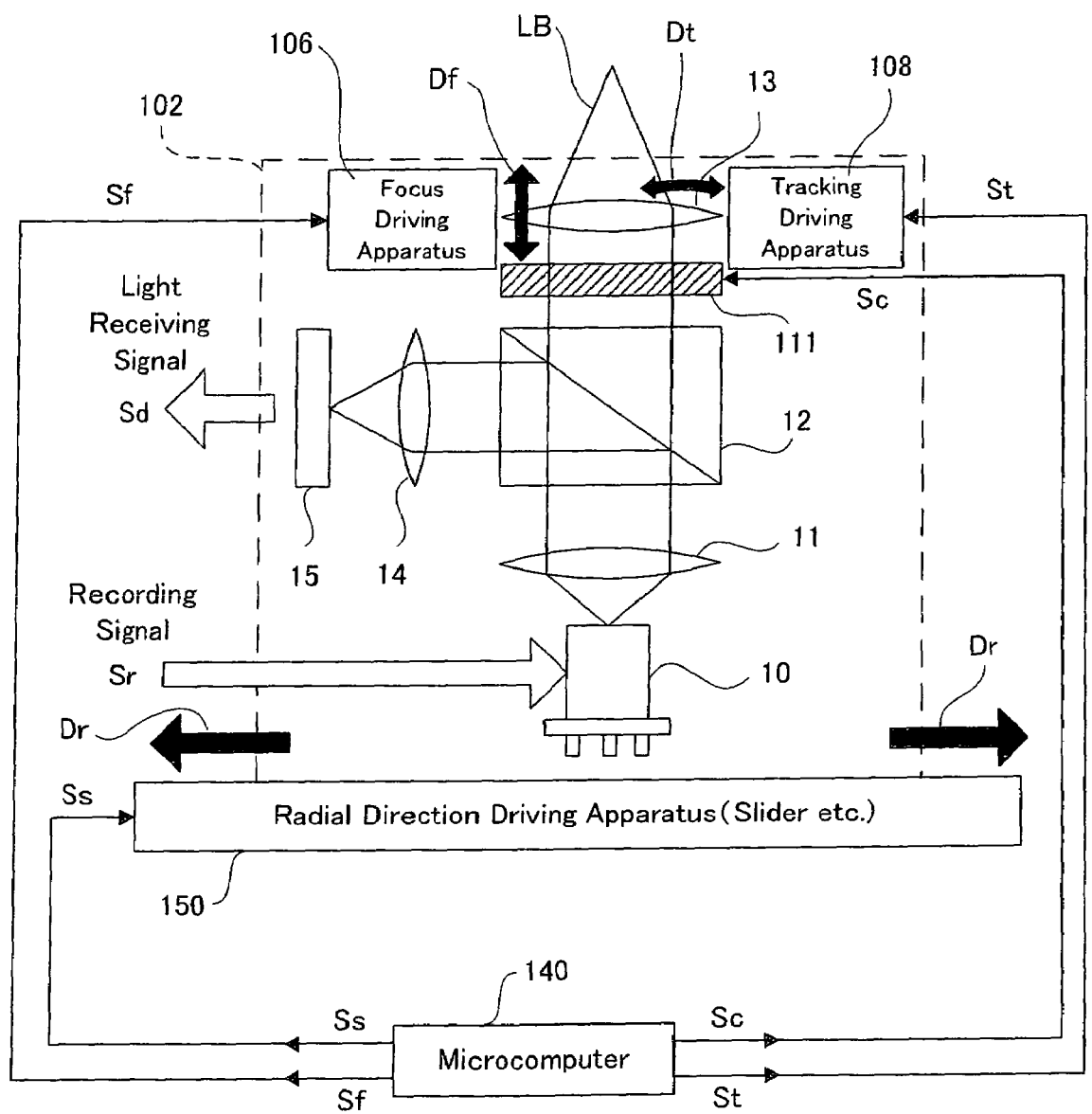
FIG. 2 is a block diagram showing a detailed structure about an optical pickup provided for the information recording/reproducing apparatus in the first embodiment.

At first, with reference to FIG. 1 and FIG. 2, the structure of an information recording/reproducing apparatus in the first embodiment of the present invention will be explained. FIG. 1 shows the whole block of the information recording/reproducing apparatus according to the first embodiment of the present invention. FIG. 2 shows a detailed structure about an optical pickup provided for the information recording/reproducing apparatus. In the first embodiment, the information recording/reproducing apparatus is provided with a tilt correcting apparatus including a tilt detecting apparatus according to the present invention, and is constructed as a DVD recorder, a DVD drive for a personal computer, or the like.

In FIG. 1, an information recording/reproducing apparatus 100 is provided with: a spindle motor 101; an optical pickup 102; a strategy generation device 104; and further, a tilt correcting apparatus 110 including a tilt detecting apparatus 105. The information recording/reproducing apparatus 100 can optically record the record information onto an optical disc 200, and can optically reproduce the record information from the optical disc 200.

The optical disc 200 is a two-layer disc which is provided, as two recording layers, with a L0 layer (i.e. a recording layer which is the closest to the irradiation side of laser light LB) and a L1 layer (i.e. a recording layer which is the second closest to the irradiation side of the laser light LB). The optical disc 200 may be a multilayer disc which is provided, as three or more recording layers, with the L0 layer, the L1 layer, a L2 layer (i.e. a recording layer which is the third closest to the irradiation side of the laser light LB), and so on. Each recording layer of the optical disc 200 is of a writable type, such as a DVD-RW and a DVD-RAM, which uses phase change and optical magnetism, for example, or of an irreversible change recording type, such as a DVD-R, which uses laser heating, or of a reproduction-only type, such as a DVD-ROM. The optical disc 200 may be a hybrid type in which various types of areas are mixed in one recording layer or a plurality of recording layers. On the optical disc 200, recording tracks, such as groove tracks and land tracks, having a wobble may be formed in each recording layer. In addition to or in place of this, pre-pits, such as land pre-pits, may be formed on the land tracks. Furthermore, record data or an address may be recorded partially or all over the optical disc 200.

In any case, the laser light LB is condensed, i.e. focused, on a desired recording layer out of the plurality of recording layers (i.e. the L0 layer and the L1 layer in FIG. 1), to thereby perform the recording and reproduction for the desired recording layer. Displacing the focus position of the laser light LB from one to the other recording layers in the lamination direction of the L0 layer and the L1 layer, i.e., in the vertical direction of FIG. 1, is referred to as "lamination direction displacement" or "layer jump", as occasion demands. Displacing the focus position of the laser light LB along the surface of the disc 200, i.e., in the left-right direction of FIG. 1, is referred to as "radial direction displacement" or "track jump", as occasion demands.

The spindle motor 101 rotates the optical disc 200 which is loaded onto the information recording/reproducing apparatus 100, in a constant linear velocity (CLV) manner, in a constant angular velocity (CAV) manner, in a zone-CAV (ZCAV) manner, or the like. The number of rotations is controlled on the basis of, e.g., a pre-pit signal, a wobble signal and a clock signal included in reproduction data, under the control of a microcomputer 140 or the like.

The optical pickup 102 irradiates the rotating optical disc 200 with laser light LB at the time of recording, to thereby optically record the record data, which is inputted through the strategy generation device 104, onto the optical disc 200. On the other hand, at the time of reproduction, the optical pickup 200 irradiates the rotating optical disc 200 with the laser light LB, to thereby optically reproduce the reproduction data from the optical disc 200.

As illustrated in FIG. 2, more specifically, the optical pickup 102 is provided with: a semiconductor laser 10; a condenser lens 11; a beam splitter 12; an objective lens 13; a condenser lens 14; and a light receiving element 15.

At the time of recording, the semiconductor laser 10 emits the laser light LB, which is generated and set at a power for recording by the strategy generation device 104 (refer to FIG. 1). Namely, the laser light LB is modulated in accordance with the record data at the power for recording. This laser light LB is emitted to the optical disc 200 through the lens 11, the beam splitter 12, and the objective lens 13. The optical pickup 102 is constructed to record the record data onto the optical disc 200 by the irradiation of the laser light LB.

On the other hand, at the time of reproduction, the semiconductor laser 10 emits the laser light LB, which is set at a relatively low power for reproduction. This laser light LB is emitted to the optical disc 200 through the lens 11, the beam splitter 12, and the objective lens 13. Moreover, its reflected light is received by the light receiving element 15 through the objective lens 13, the beam splitter 12, and the condenser lens 14, to thereby generate light receiving signal (which is an example of "photo-detection signal") Sd. The optical pickup 102 is constructed to reproduce the record data from the optical disc 200, on the basis of the light receiving signal Sd, by the irradiation of the laser light LB.

At the time of such recording or reproduction, focus driving is performed in a direction as shown by an arrow Df, in response to a focus control signal Sf from the microcomputer 140 (or a focus servo apparatus), by a focus driving apparatus 106 which is provided with a focus actuator or the like for the optical pickup 102. For example, focus servo is performed such that the objective lens 13 is displaced in the optical axis direction of the laser light LB so as to reduce a focus error signal. On the other hand, tracking driving is performed in a direction as shown by an arrow Dt, in response to a tracking control signal St from the microcomputer 140 (or a tracking servo apparatus), by a tracking driving apparatus 108 which is provided with a tracking actuator or the like for the optical pickup 102. For example, tracking servo is performed such that the objective lens 13, or a part or all of the optical system of the optical pickup 102 is displaced in the radial direction of the optical disc 200 so as to reduce a tracking error signal. Moreover, radial direction displacement is performed in a direction as shown by an arrow Dr, in response to a displacement control signal Ss from the microcomputer 140, by a radial direction driving apparatus 150 which is provided with a slider or the like. For example, normal displacement at the time of recording or reproduction, or track jump is performed.

Particularly in the first embodiment, the optical pickup 102 is provided with a tilt correction device 111 which can change the irradiation angle of the laser light LB to the optical disc 200, namely, which can make a tilt correction. The tilt correction device 111 is provided with a liquid crystal correction element, for example, and cancels the coma aberration of the laser light LB by applying a voltage to the liquid crystal, in response to a tilt control signal Sc from the microcomputer 140, to thereby change the irradiation direction of the laser light LB within a slight angle range, such as several tenths of a degree and several degrees. Alternatively, the tilt correction device 111 may be provided with a movable device which is electric, electromagnetic, mechanical, or electromechanical, and which changes the irradiation axis of the laser light LB. For example, the tilt correction device 111 may be provided with an apparatus for tilting the optical pickup 102 by various actuators or an apparatus for tilting the objective lens 13. Moreover, the tilt correction device 111 can be shared with the tracking driving apparatus 108, at least partially.

In making such a tilt correction, the correction is made in accordance with the predetermined amount of tilt at each radial direction position of the optical disc 200 as described in detail later; namely, the correction is made in accordance with the disc profile of the optical disc 200 which is obtained in advance. By this, a tilt correction can be made accurately at any radial direction position of the optical disc 200. Incidentally, the tilt correction device 111 is used not only for the tilt correction at the time of actual recording of the record data or actual reproduction of the reproduction data, but also for the detection of the amount of tilt which is performed before the recording or reproduction, as described in detail later, in order to slightly change the irradiation angle of the laser light LB. In this sense, the tilt correction device 111 (and a driver 116 for tilt correction, as described later) also functions as a part of the tilt detecting apparatus 105.

Again in FIG. 1, the strategy generation device 104 implements a strategy to the record data, and generates a recording signal Sr. Specifically, the strategy generation device 104 generates the recording signal Sr corresponding to the record data so as to optimize jitter, signal strength, symmetry, or the like at the time of reproduction, and supplies it to the optical pickup 102.

The tilt correcting apparatus 110 is provided with: the tilt detecting apparatus 105; the driver 116 for tilt correction; and the tilt correction device 111 incorporated or built in the optical pickup 102 (refer to FIG. 2).

The tilt detecting apparatus 105 is provided with: a LPP signal generation device 112 for generating a land pre-pit (LPP) signal from a light receiving signal generated in the optical pickup 102; a wobble signal generation device 122 for generating a wobble signal from the light receiving signal; and a RF signal generation device 132 for generating a radio frequency (RF) signal from the light receiving signal. The tilt detecting apparatus 105 is further provided with: bottom hold circuits 113, 123, and 133; and peak hold circuits 124 and 134.

The bottom hold circuit 113 holds the signal voltage at a bottom level of a LPP signal generated by the LPP signal generation device 112. The bottom hold circuit 123 holds the signal voltage at a bottom level of a wobble signal generated by the wobble signal generation device 122. The bottom hold circuit 133 holds the signal voltage at a bottom level of a RF signal generated by the RF signal generation device 132. The peak hold circuit 124 holds the signal voltage at a peak level of a wobble signal generated by the wobble signal generation device 122. The peak hold circuit 134 holds the signal voltage at a peak level of a RF signal generated by the RF signal generation device 132.

The microcomputer 140 constitutes one example of the "controlling device" of the present invention. As described in detail later, under the control of the microcomputer 140, (i) the tilt detecting apparatus 105 detects the amount of tilt or performs a disc profile measurement before the information recording/reproducing apparatus 100 records the record data, and further (ii) the tilt correcting apparatus 110 makes a tilt correction when the information recording/reproducing apparatus 100 records the record data.

Figure 3:
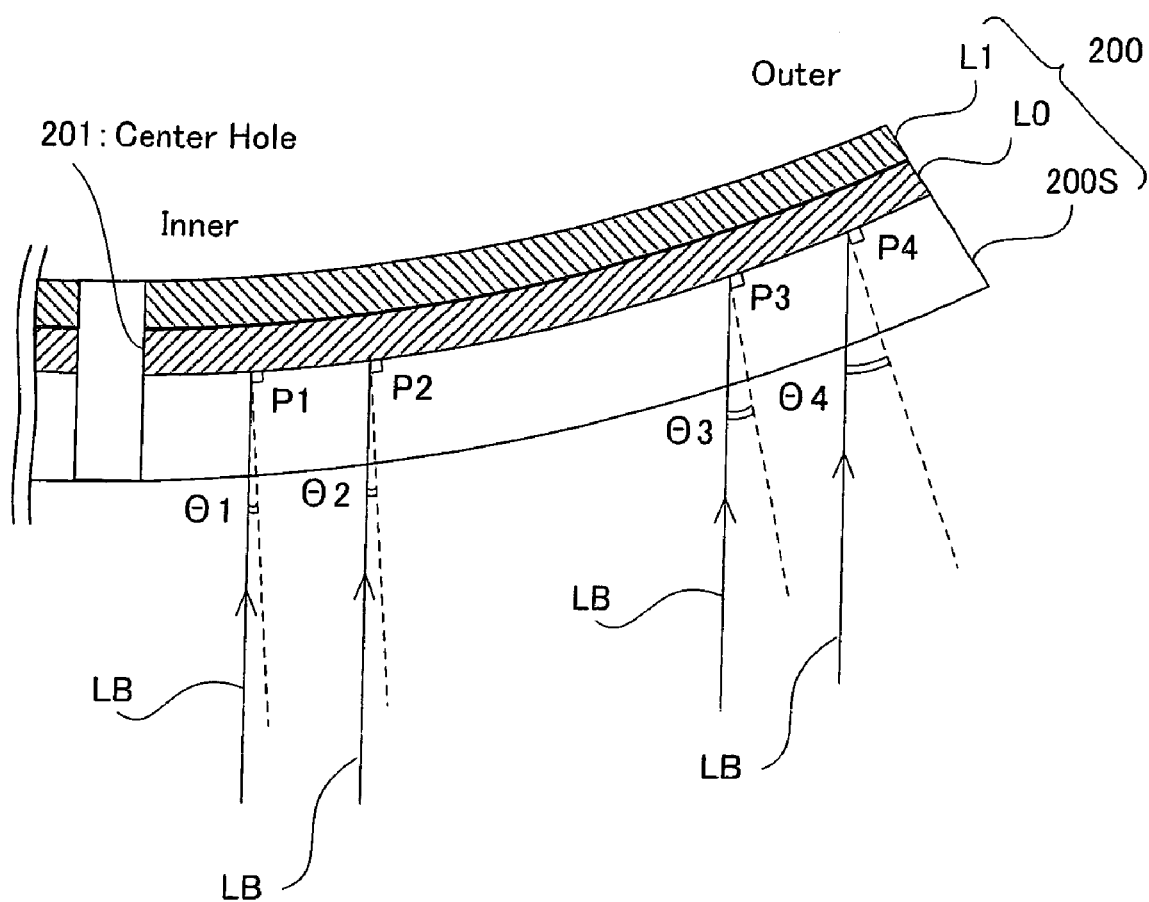
FIG. 3 is a partial cross sectional view showing an optical disc in the first embodiment if the optical disc is cut by a plane parallel to the central axis of the optical disc.

With reference to FIG. 3, the amount of tilt will be explained. FIG. 3 shows the partial cross section of the optical disc 200 if the optical disc 200 is cut by a plane parallel to the central axis.

In FIG. 3, the optical disc 200 extends in a disc shape from the inner to the outer circumferential side, with a center hole 201 as the center. The disc tilt (or inclination) increases toward the outer circumferential side. Namely, at a first tilt measurement point P1 which is the nearest to the inner circumferential side in the L0 layer, the normal direction thereof is substantially equal to or matched with the irradiation direction of the laser light LB (in which, however, angle setting is performed so as to match the irradiation direction with the normal direction, with respect to the surface of the ideal optical disc 200 without tilt, in this case), and the amount of tilt θ1 made by them is extremely small. At a second tilt measurement point P2 which is the second nearest to the inner circumferential side in the L0 layer, the amount of tilt θ2 is greater than the amount of tilt θ1. Moreover, at a third tilt measurement point P3 which is nearer to the outer circumferential side in the L0 layer, the amount of tilt θ3 is fairly large. At a next fourth tilt measurement point P4 in the L0 layer, the amount of tilt θ4 is much greater than the amount of tilt θ3. As described above, the amount of tilt θ at each radial direction position on the surface of the optical disc 200 makes a function of a radius r, and is expressed as the amount of tilt θ(r). The amount of tilt θ(r) tends to increase greatly, towards the outer circumference of the optical disc 200. For example, at the most outer circumferential position of the optical disc 200 and at the fourth tilt measurement point P4, it could be several tenths of a degree or several degrees. Incidentally, in FIG. 3, the amount of tilt θ, which is the inclination of the surface of the optical disc 200, is defined on the basis of the normal direction of the surface of the optical disc 200. However, the amount of tilt θ may be defined as an angle made by the irradiation direction of the laser light LB and the ideal irradiation direction of the laser light LB which maximizes a RF signal if the RF signal is detected from the surface of the optical disc 200. In general, however, the ideal irradiation direction of the laser light LB is equal to the normal direction of the surface of the optical disc 200, so that the amount of tilt θ(r) will take the same value on the basis of any of them.

Again in FIG. 1, the microcomputer 140 stores the amount of tilt for each recording layer, determined as described later (e.g. θ1 to θ4 for each of the L0 layer and the L1 layer), or the disc profile (e.g. θ(r) for each of the L0 layer and the L1 layer, wherein r: radius) into a memory 141 for storing a correction value. This amount of tilt is the same as a correction value to be tilted by the tilt correction device 111, which is necessary to match the laser light LB with the normal direction of the optical disc 200. Alternatively, the microcomputer 140 stores a correction value, which is determined depending on the amount of tilt, by the tilt correction device 111 for matching the irradiation direction of the laser light LB with a direction which maximizes the RF signal (however, this correction value will be the same as the amount of tilt if the normal direction of the optical disc 200 is equal to or matched with the irradiation direction which maximizes the RF signal, as can be clearly seen from FIG. 3).

In addition, when the information recording/reproducing apparatus 100 records the record data, the microcomputer 140 refers to the amount of tilt or the correction value which is stored in the memory 141 for storing a correction value, to thereby control the tilt correction device 111 through the driver 116 for tilt correction so as to correct the irradiation angle of the laser light LB in accordance with the predetermined amount of tilt as described in detail later. More specifically, the driver 116 for tilt correction generates a tilt control signal Sc corresponding to the determined amount of tilt so as to make the irradiation direction of the laser light LB close to or preferably to match it with the normal direction of the optical disc 200. Alternatively, the driver 116 for tilt correction generates a tilt control signal Sc corresponding to the determined amount of tilt so as to make the irradiation direction of the laser light LB close to or preferably to match it with the ideal irradiation direction of the laser light which maximizes a RF signal if the RF signal is detected from the surface of the optical disc 200. The tilt control signal Sc generated in this manner is supplied to the tilt correction device 111, to thereby make a tilt correction, quickly and highly accurately.

In the above-mentioned structure in the first embodiment, one example of the "first changing device" of the present invention is constructed from the focus driving apparatus 106, and one example of the "second changing device" of the present invention is constructed from the radial direction driving apparatus 150. One example of the "tilt detecting device" of the present invention is constructed from the wobble signal generation device 122, the RF signal generation device 132, the bottom hold circuits 122 and 133, the peak hold circuits 124 and 134, and the microcomputer 140. Moreover, one example of the "controlling device", the "processing device", the "offset calculating device", and the "management table generating device" is constructed from the microcomputer 140.

Figure 4:
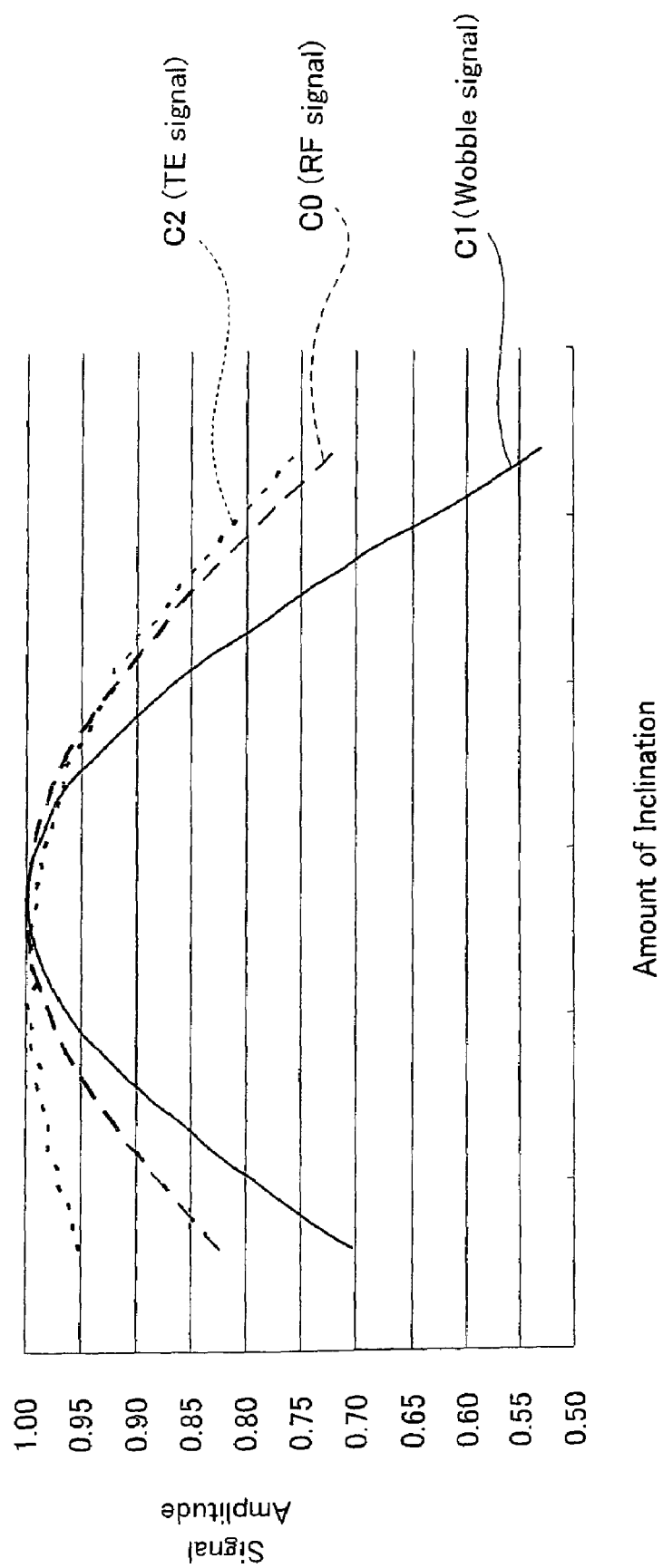
FIG. 4 is a feature diagram showing a change in a signal amplitude versus the amount of inclination in an irradiation direction of laser light, for a RF signal, a wobble signal, and a tracking error (TF) signal, as respective feature curves, in the first embodiment.

Next, with reference to FIG. 4, a method of determining the amount of tilt at one tilt measurement point in one recording layer by using a RF signal, a wobble signal, or a tracking error signal by the tilt detecting apparatus 105 will be explained. FIG. 4 shows a change in the amplitude of a RF signal versus the amount of inclination in the irradiation direction of the laser light LB, as a feature curve C0, a change in the amplitude of a wobble signal versus the amount of inclination in the irradiation direction of the laser light LB, as a feature curve C1, and a change in the amplitude of a tracking error (TE) signal versus the amount of inclination in the irradiation direction of the laser light LB, as a feature curve C2.

As shown in FIG. 4, if the laser light LB is tilted on the basis of the normal direction of the surface of the optical disc 200, the amplitude of a RF signal, the amplitude of a tracking error (TE) signal, and the amplitude of a wobble signal are reduced, individually. Namely, each of the feature curves C0, C1, and C2 has a parabolic shape which opens to the lower side with the amount of inclination=0 as the center, where there is no inclination from the normal line of the surface of the optical disc 200. Therefore, if the amplitude of these signals is the maximum, it can be said that it is ideal where the irradiation direction of the laser light LB is equal to the normal direction of the surface of the optical disc 100 on a light spot by the laser light LB at that time. In practice, the amplitude of a RF signal is directly important in reproducing the record data. Thus, when the amplitude of a RF signal is the maximum, it may be treated as an ideal state. In this sense, if a RF signal can be detected at each of the tilt measurement points on the optical disc 200 (e.g. each of the tilt measurement points P1 to P4 in FIG. 3), it is preferable to detect the amount of tilt by using the amplitude of the RF signal.

If a RF signal can not be detected at each of the tilt measurement points on the optical disc 200, it is preferable to detect the amount of tilt by using the amplitude of a tracking error signal and a wobble signal, instead of the RF signal.

In the first embodiment, if a RF signal can be detected at each of the tilt measurement points, the amplitude of a RF signal is obtained from the signal voltages at the bottom level and the peak level of the RF signal, each of which is held by respective one of the bottom hold circuit 133 and the peak hold circuit 134 (refer to FIG. 1), and is used to obtain the amount of tilt. On the other hand, if a RF signal can not be detected at each of the tilt measurement points, the amplitude of a wobble signal is obtained from the signal voltages at the bottom level and the peak level of the wobble signal, each of which is held by respective one of the bottom hold circuit 123 and the peak hold circuit 124 (refer to FIG. 1), and is used to obtain the amount of tilt. Alternatively, the amplitude of a tracking error signal used for tracking servo on the tracking driving apparatus is used to obtain the amount of tilt.

More specifically, in the tilt detection at one tilt measurement point in one recording layer, at first, a laser spot which is formed by focusing the laser light LB on the L0 layer or the L1 layer is stopped at one tilt measurement point whose radial direction position is fixed (e.g. any one of the first to fourth tilt measurement points P1 to P4 described in FIG. 3), under the control of the microcomputer 140 (in this case, a RF signal, a wobble signal, or a tracking error signal is obtained since the optical disc 200 is rotating). The tilt correction device 111 is controlled to make a first irradiation direction, which is obtained when the laser light LB is emitted in such a standard condition that the application voltage to the liquid crystal of the tilt correction device 111 is made or set to be 0 (wherein the inclination to the normal direction of the surface of the optical disc 200 is regarded as the amount of inclination $\phi 1$), and the amplitude of a RF signal, a wobble signal, or a tracking error signal is measured in this state. Then, with the laser spot being stopped at the same radial direction position and in the same recording layer (i.e. the L0 layer and the L1 layer), the tilt correction device 111 is controlled to make a second irradiation direction, which is obtained when the laser light LB is emitted with it inclined at several tenths of a degree, for example, toward one side from the previous condition (wherein the inclination to the normal direction of the surface of the optical disc 200 is regarded as the amount of inclination $\phi 2$), and the amplitude of a RF signal, a wobble signal, or a tracking error signal is measured in this state. Then, with the laser spot being stopped at the same radial direction position and in the same recording layer (i.e. the L0 layer or the L1 layer), the tilt correction device 111 is controlled to make a third irradiation direction, which is obtained when the laser light LB is emitted with it inclined at several tenths of a degree, for example, toward the opposite side to the second irradiation direction from the previous condition (wherein the inclination to the normal direction of the surface of the optical disc 200 is regarded as the amount of inclination $\phi 3$), and the amplitude of a RF signal, a wobble signal, or a tracking error signal is measured in this state.

By these, on one hand, if the amplitude of a RF signal is measured, three points of (the amount of inclination $\phi 1$, a signal amplitude A1), (the amount of inclination $\phi 2$, a signal amplitude A2), and (the amount of inclination $\phi 3$, a signal amplitude A3) are obtained as three coordinates which are supposed to locate on the feature curve C0 shown in FIG. 4. Then, the three points are interpolated so as to make the feature curve C0 as shown in FIG. 4, or the feature curve C0 shown in FIG. 4 is obtained by an approximation from the three points. The amount of inclination $\phi$ which gives a vertex (i.e. the maximum value or the greatest value) on the feature curve C0 obtained in this manner is determined as the amount of tilt $\theta$ at the tilt measurement point.

By these, on the other hand, if the amplitude of a wobble signal is measured, three points of (the amount of inclination $\phi 1$, a signal amplitude A1), (the amount of inclination $\phi 2$, a signal amplitude A2), and (the amount of inclination $\phi 3$, a signal amplitude A3) are obtained as three coordinates which are supposed to locate on the feature curve C1 shown in FIG. 4. Alternatively, if the amplitude of a tracking error (TE) signal is measured, three points of (the amount of inclination $\phi 1$, a signal amplitude A1), (the amount of inclination $\phi 2$, a signal amplitude A2), and (the amount of inclination $\phi 3$, a signal amplitude A3) are obtained as three coordinates which are supposed to locate on the feature curve C2 shown in FIG. 4. In any case, as in the case of the above-mentioned RF signal, the feature curve C1 or C2 is obtained by the interpolation or approximation. The amount of inclination $\phi$ which gives a vertex (i.e. the maximum value or the greatest value) is determined as the amount of tilt $\theta$ at the tilt measurement point.

Moreover, if a difference between the amount of tilt which gives the amplitude peak of a RF signal and the amount of tilt which gives the amplitude peak of a tracking error signal is obtained in advance as an "offset between signals" in the operation process of the microcomputer 140, it is also possible to obtain an equivalent value to the amount of tilt which is determined by using the amplitude of a RF signal, by applying the value of the offset between signals to the amount of tilt which is determined by using the amplitude of a tracking error signal. In the same manner, if a difference between the amount of tilt which gives the amplitude peak of a RF signal and the amount of tilt which gives the amplitude peak of a wobble signal is obtained in advance as an "offset between signals" in the operation process of the microcomputer 140, it is also possible to obtain an equivalent value to the amount of tilt which is determined by using the amplitude of a RF signal, by applying the value of the offset between signals to the amount of tilt which is determined by using the amplitude of a wobble signal. Even such an "offset between signals" may be also stored in the memory 141 for storing a correction value in advance, for example.

Incidentally, in the above-mentioned example, the irradiation direction of the laser light LB or the amount of inclination at one tilt measurement point whose radial direction position is fixed is changed three times, and the amplitude of a RF signal, a wobble signal, or a tracking error signal is detected. Namely, the feature curve C0, C1, or C2 shown in FIG. 4 is obtained by approximation using three points. However, it may be changed four times to detect the amplitude of a RF signal, a wobble signal, or a tracking error signal. Namely, the feature C0, C1, or C2 shown in FIG. 4 may be obtained by approximation using four points or more. Moreover, many RF signals, wobble signals, or tracking error signals can be detected at one tilt measurement point, and out of them, the amount of inclination corresponding to a RF signal, a wobble signal, or a tracking error signal with the maximum amplitude can be regarded as the amount of tilt.

In addition, although it depends on how to set the optical system in the optical pickup 102, if the amount of correction=0 by the tilt correction device 111, such as a liquid crystal correction element, the irradiation angle of the laser light LB often tends to be the amount of inclination near the vertexes of the feature curves C0 to C1. Therefore, if the amount of tilt is measured in the condition that the amount of correction=0 by the tilt correction device 111, and if the irradiation angle (i.e. the inclination) is changed at about several tenths of a degree from this point to the both sides to obtain the above-mentioned three points on the feature diagram, it is possible to approximate the feature curves C0 to C1, relatively quickly and easily, which is useful in practice. In the case where the amount of correction=0 by the tilt correction device 111, if the irradiation angle of the laser light LB is not the amount of inclination near the vertexes of the feature curves C0 to C1, i.e., if the irradiation angle is far away from the vertexes, then, the inclination is changed greatly from this, to thereby obtain the above-mentioned three points on the feature diagram. This is how to approximate the feature curves C0 to C1.

As descried above, the amplitude of a signal is measured by the above-mentioned three irradiation angles at the first tilt measurement point P1 in the L0 layer as illustrated in FIG. 3, to thereby obtain the amount of tilt θ1 at the first tilt measurement point P1 in the L0 layer. In the same manner, the amplitude of a signal is measured by the above-mentioned three irradiation angles at the second tilt measurement point P2 in the L0 layer, to thereby obtain the amount of tilt θ2. In the same manner, the amplitude of a signal is measured by the above-mentioned three irradiation angles at each of the third and fourth tilt measurement points P3 and P4 in the L0 layer, to thereby obtain respective one of the amounts of tilt θ3 and θ4. By the amounts of tilt θ1 to and θ4 at the first to fourth tilt measurement points P1 to P4 in the L0 layer, the distribution of the amount of tilt in the L0 layer at all the radial direction positions of the optical disc 200 is obtained by approximation or interpolation. Namely, the disc profile measurement in the L0 layer is possible.

If the low accuracy is accepted, three or two tilt measurement points may be used. If the higher accuracy is desired, five or more tilt measurement points may be used.

In the same manner, the amplitude of a signal is measured by the above-mentioned three irradiation angles at each of the four tilt measurement points in the L1 layer, for example, to thereby obtain the amount of tilt at each of the four tilt measurement points in the L1 layer. By this, the disc profile measurement in the L1 layer is also possible.

Figure 5:
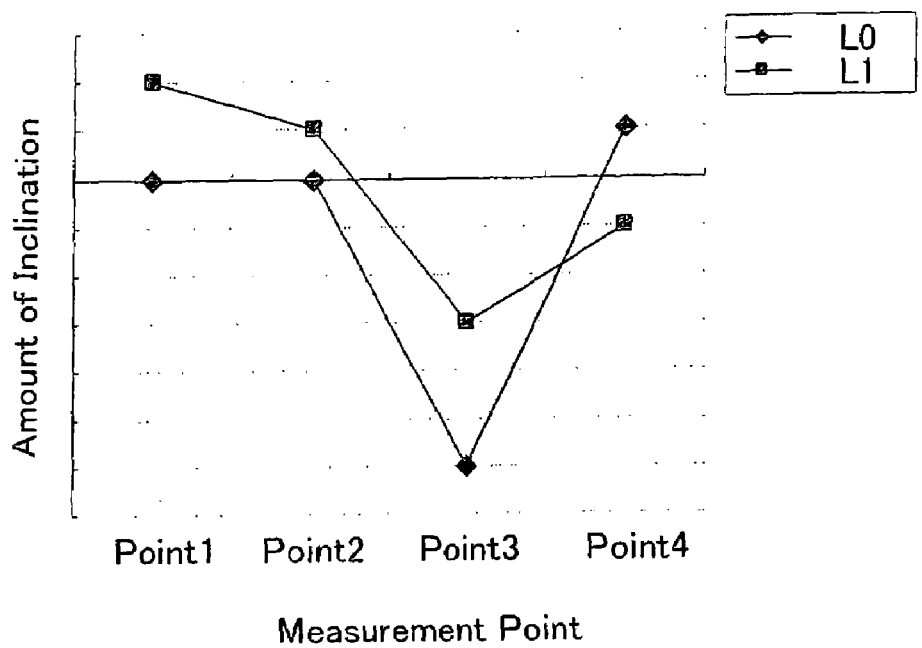
FIG. 5 is a specification view showing the amount of tilt at four measurement points which are located at the same radial direction position of the four tilt measurement points shown in FIG. 3, in one specific two-layer disc in the first embodiment.
Figure 6:
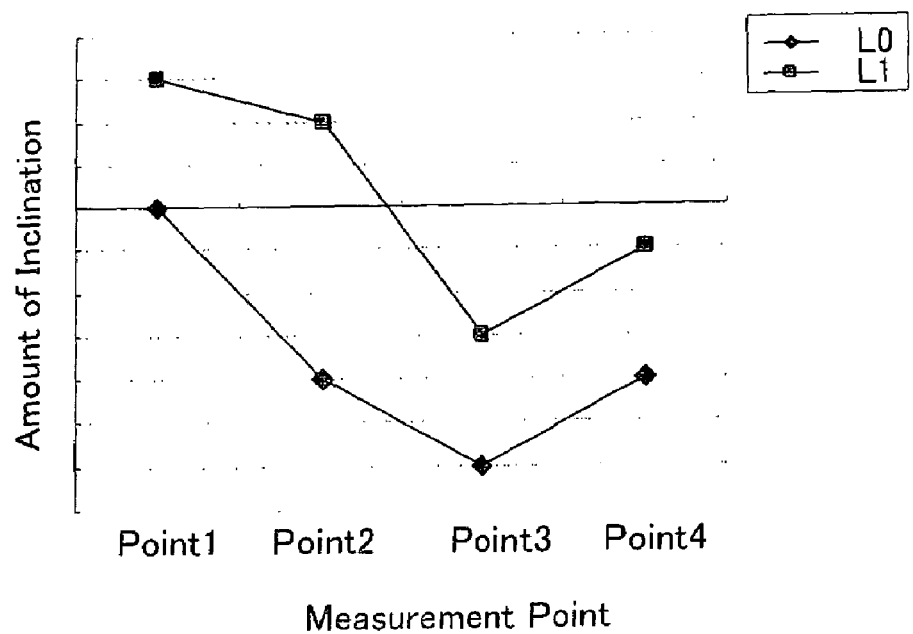
FIG. 6 is a specification view showing the amount of tilt at four measurement points which are located at the same radial direction position of the four tilt measurement points shown in FIG. 3, in another specific two-layer disc in the first embodiment.

Particularly, according to the findings of the inventors of the present invention, the disc profile is normally not the same in the L0 layer and the L1 layer. This point will be explained with reference to FIG. 5 and FIG. 6. FIG. 5 and FIG. 6 are specification views showing the amount of tilt (which is determined by the tilt determining method, explained with reference to FIG. 4) at four measurement points (Point 1 to Point 4) which are located at the same radial direction position of the four tilt measurement points shown in FIG. 3, in two specific two-layer discs As can be seen from FIG. 5 and FIG. 6, the distribution of the amount of tilt in the L0 layer in the radial direction of the optical disc 200 as shown in FIG. 3 (i.e. the disc profile in the L0 layer) is not equal to the distribution of the amount of tilt in the L1 layer in the radial direction of the optical disc 200 (i.e. the disc profile in the L1 layer). In other words, the interlayer distance of the L0 layer and the L1 layer is not uniform or constant in the disc plane. Namely, under the assumption that disc profiles in a plurality of recording layers are mutually the same because they are on the same optical disc 200, if a tilt correction is made at the actual recording or reproduction, the tilt correction is appropriately made with respect to a recording layer which is the direct object of the tilt detection, but the tilt correction is not always appropriately made with respect to the other recording layer. Thus, in the first embodiment, while the disc profile measurement in the L0 layer is performed, the disc profile measurement in the L1 layer is also performed, in the tilt detection. Moreover, as described in detail later, these measurements are performed, efficiently and quickly, as a whole.

Figure 7:
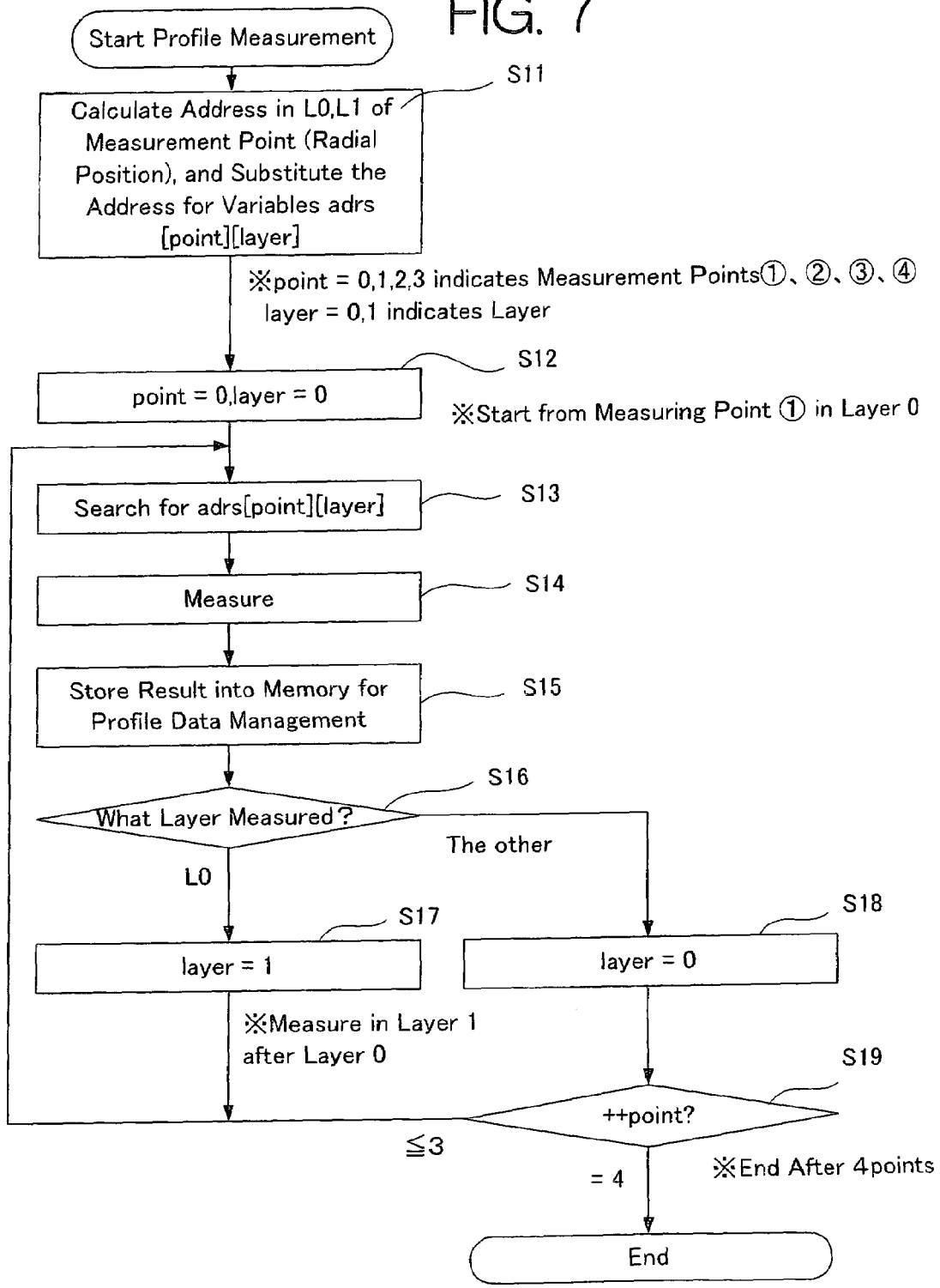
FIG. 7 is a flowchart showing an operation of measuring the amount of tilt of the optical disc by a tilt correcting apparatus in the first embodiment.
Figure 8:
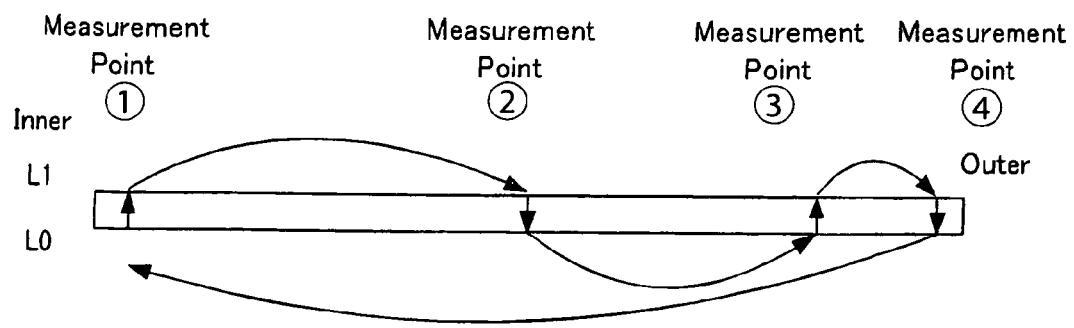
FIG. 8 is a schematic cross sectional view of the optical disc showing a measurement procedure in the first embodiment in association with the cross section of the optical disc extending in the radial direction.
Figure 9:
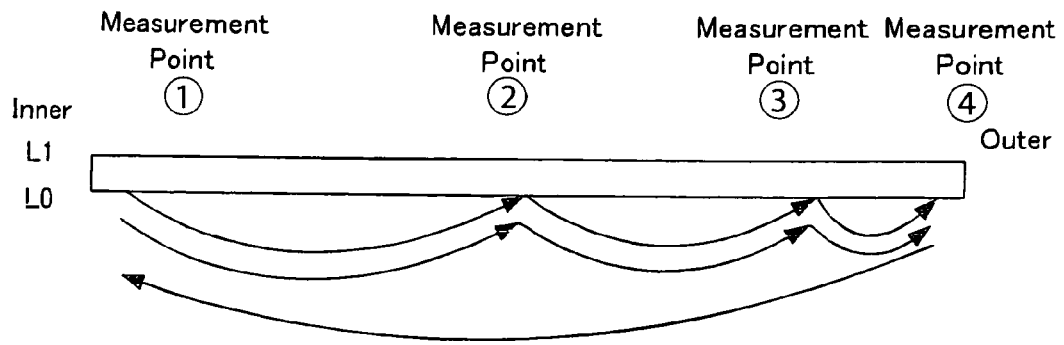
FIG. 9 is a view having the same point of FIG. 8 in a comparison example.
Figure 10:
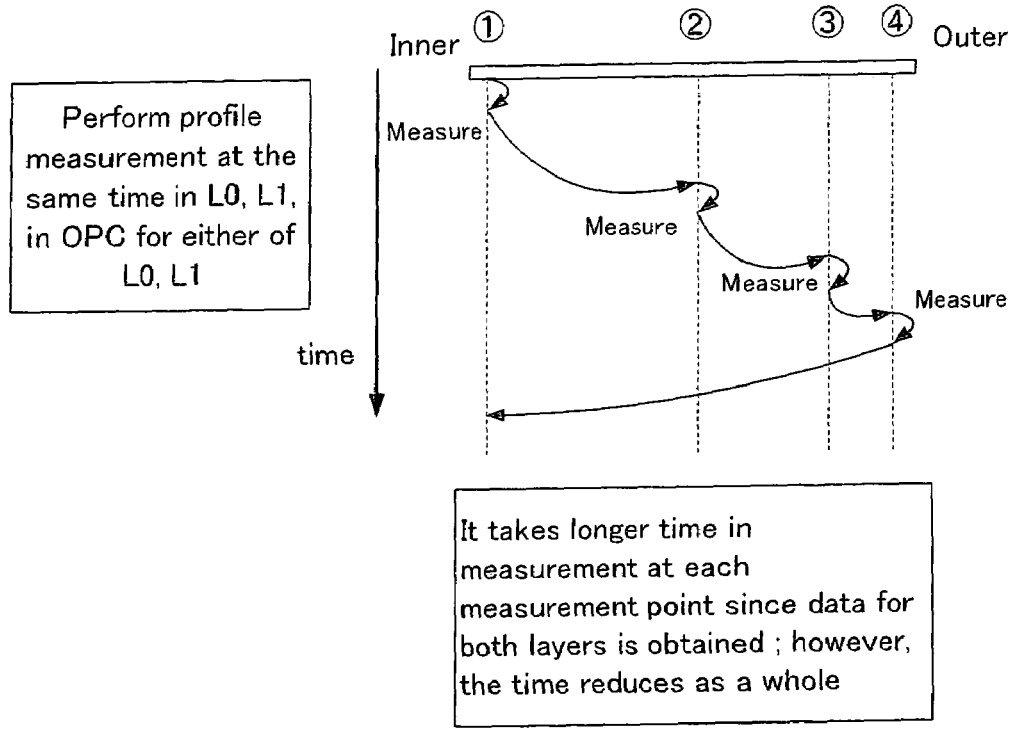
FIG. 10 is a feature diagram showing the measurement procedure in the first embodiment in association with the cross section of the optical disc extending in the radial direction and a measuring time.
Figure 11:
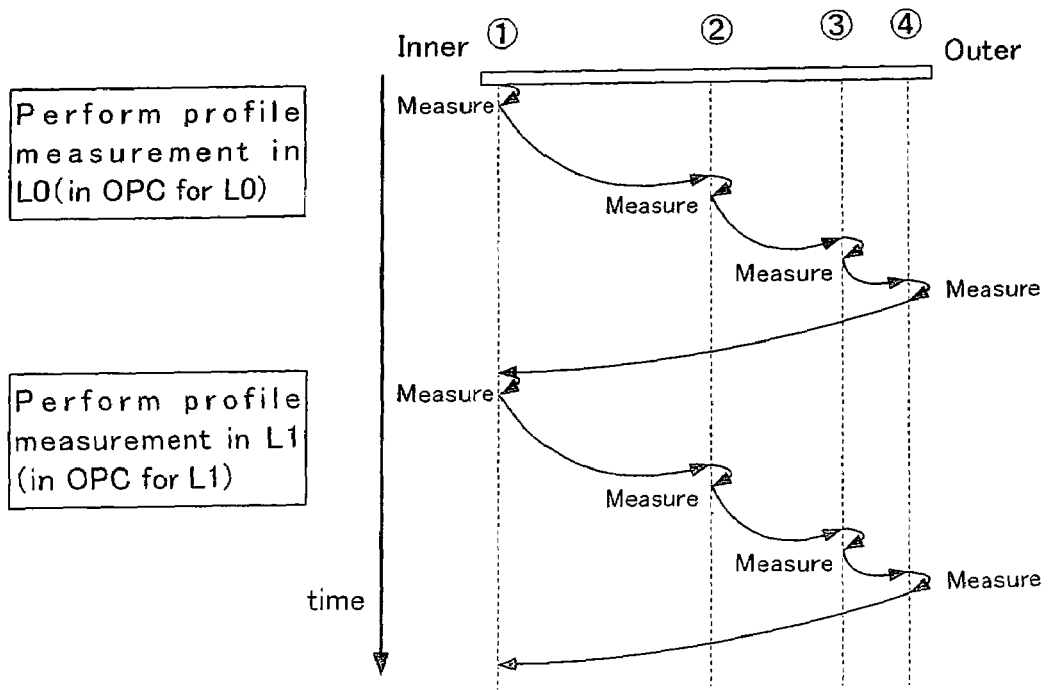
FIG. 11 is a diagram having the same point of FIG. 10 in a comparison example.

Next, with reference to FIG. 7 to FIG. 11, an explanation is given to an operation of sequentially measuring the amount of tilt at a plurality of measurement points in the L0 layer and the L1 layer, efficiently, by the tilt detecting apparatus 105 in the first embodiment. FIG. 7 is a flowchart showing an operation of measuring the amount of tilt of the optical disc 200 by the tilt correcting apparatus 105. FIG. 8 is a schematic cross sectional view of the optical disc showing a measurement procedure in the first embodiment in association with the cross section of the optical disc extending in the radial direction. FIG. 9 is a view having the same point of FIG. 8 in a comparison example. FIG. 10 is a feature diagram showing the measurement procedure in the first embodiment in association with the cross section of the optical disc extending in the radial direction and a measuring time. FIG. 11 is a diagram having the same point of FIG. 10 in a comparison example;

In FIG. 7, at first, the address in the L0 layer and the address in the L1 layer of a plurality of measurement points which are appropriate for the disc profile measurement are individually obtained and substituted for variables adrs [point][layers] which are set by the microcomputer 140 (step S11). In this case, the variable point=0, 1, 2, or 3 indicates measurement points ①, ②, ③, and ④ in FIG. 8 and FIG. 10, respectively. Moreover, the variable layer=0 or 1 indicates the L0 layer or the L1 layer, respectively. As described above, the radial direction position related to each measurement point is converted to the address, to thereby perform, the radial direction displacement to each measurement point by the radial direction driving apparatus 150 (refer to FIG. 2), quickly and highly accurately, by address search.

Incidentally, the optical disc 200 may be a "parallel manner" optical disc on which all the addresses of the L0 layer and the L1 layer are assigned from the inner to the outer circumferential side. Alternatively, the optical disc 200 may be an "opposite manner" optical disc on which the addresses of the L0 layer are assigned from the inner to the outer circumferential side and the addresses of the L1 layer are assigned from the outer to the inner circumferential side as opposite to the addresses of the L1 layer. In any case, the quick displacement to either the L0 layer or the L1 layer can be performed by the address search.

Next, in the first embodiment, under the condition that the measurement is started from the measurement point ① in the L0 layer, the variable point=0 and the variable layer=0 are substituted as initial values (step S12). Then, a search for the address shown by the variable adrs [point] [layer] is performed in the L0 layer. Namely, focusing or focus jump onto the L0 layer is performed by the focus driving apparatus 106 (refer to FIG. 2). Before or after this, the radial direction displacement or track jump to the measurement point ① is performed by the radial direction driving apparatus 150 (refer to FIG. 2). (step S13).

Next, while the focus position of the laser light LB is maintained in the L0 layer and at the measurement point ①, the amplitude of a RF signal, a wobble signal, or a tracking error signal is measured, as explained with reference to FIG. 4, and the amount of tilt at this measurement point is determined (step S14). The amount of tilt as the result is stored in a memory for profile data management, in association with the L0 layer and the measurement point ①. In the first embodiment, this memory is logically constructed as one area in the memory 141 for storing a correction value. Alternatively, this memory may be constructed as another memory, inside or outside the microcomputer 140 (step S15).

Then, it is judged whether or not the measurement for the L0 layer is performed in the steps S13 to S15 (step S16). If the measurement for the L0 layer is performed (the step S16: L0), it is considered that the next measurement will be performed for the L1 layer, and the variable layer=1 is substituted (step S17). Then, the operational flow returns to the step S13. In this case, while the radial direction position is fixed at the measurement point ① by the radial direction driving apparatus 150 (refer to FIG. 2), the focus jump from the L0 layer to the L1 layer is performed by the focus driving apparatus 106 (refer to FIG. 2) (the step S13). Then, the amount of tilt at the measurement point ① in the L1 layer is determined (the step S14), and is stored in the memory for profile data management in association with the L1 layer and the measurement point ① (the step S15).

On the other hand, in the judgment of the step S16, if the measurement for the L0 layer is not performed (the step S16: the other), it is considered that the next measurement will be performed for the L0 layer, and the variable layer=0 is substituted (step S18). Then, it is judged whether or not the measurement point is the measurement point ④. Namely, it is judged whether the variable point is 3 or less, or equal to 4 (step S19). In this judgment, if the variable point is 3 or less (the step S19: ≦3), the variable point is incremented, and the operational flow returns to the step S13. In this case, the measurement point is displaced to the measurement point ② in the L0 layer by the radial direction driving apparatus 150 and the focus driving apparatus 106 (refer to FIG. 2) (the step S13). Then, the amount of tilt at the measurement point ② in the L0 layer is determined (the step S14), and is stored in the memory for profile data management in association with the L0 layer and the measurement point ② (the step S15).

The above-mentioned processing in the steps S13 to S19 is performed at the measurement points ① to ④ in the L0 layer and the L1 layer. In the end, if the variable point is equal to 4 (the step S19:=4), it is considered that the measurement at all the measurement points is completed, and a series of profile measurement is ended.

As described above, according to the first embodiment, the measurement procedure for the profile measurement in the L0 layer and the L1 layer is shown as in FIG. 8 and FIG. 10. FIG. 8 and FIG. 10 show the displacement of the focus position of the laser light LB by using arrows.

In a comparison example shown in FIG. 9 and FIG. 11, the disc profile measurement for the L0 layer is performed by focusing the laser light LB on the L0 layer, and the disc profile measurement for the L1 layer is performed by focusing the laser light LB on the L1 layer. In this case, at first, the measurement is performed at the measurement points ① to ④ in the L0 layer, and then, the measurement is performed at the measurement points ① to ④ in the L1 layer. FIG. 9 and FIG. 11 show the displacement of the focus position of the laser light LB by using arrows.

Comparing the measurement procedure in the first embodiment shown in FIG. 8 and FIG. 10 with that in the comparison example shown in FIG. 9 and FIG. 11, it takes longer time in the measurement at each measurement point in the first embodiment because the amount of tilt is obtained in both the L0 layer and the L1 layer at each measurement point. However, as a whole, the focus jump is performed at each measurement point in the first embodiment, to thereby reduce the displacement distance in the radial direction and reduce the number of times of displacement in the radial direction, remarkably. As compared to the comparison example, it is found that it is possible to detect the amount of tilt in both the L0 layer and the L1 layer, remarkably efficiently and in a remarkably short time. Moreover, according to the first embodiment, by totalizing the amount of tilt detected in this manner, for each of the L0 layer and the L1 layer, the disc profile measurement for each of the L0 layer and the L1 layer can be performed, accurately and quickly.

Second Embodiment

Next, with reference to FIG. 12 and FIG. 13, an information recording/reproducing apparatus in the second embodiment of the present invention will be explained. FIG. 12 is a flowchart showing a tilt correction operation in performing focus jump at the time of recording or reproduction, in the second embodiment. FIG. 13 conceptually shows a measurement-result management table which is referred to in performing the focus jump in the second embodiment. The structure and the operation in the second embodiment are substantially the same as those in the above-mentioned first embodiment. Particularly in the second embodiment, the measurement result or the disc profile, which is obtained by the measurement as explained with reference to FIG. 7, is maintained as the measurement-result management table, and the measurement-result management table is referred to after the focus jump, to thereby make a tilt correction, quickly and accurately. Hereinafter, these points, which are different from the first embodiment, will be explained.

In FIG. 12, if the focus jump is performed at the time of recording or reproduction of the record data, it is judged to which layer of the L0 layer and the L1 layer the jump is performed (step S21). In the case of the focus jump to the L0 layer (the step S21: L0), a pointer for tilt information management which is provided for the microcomputer 140 is changed to a value for indicating the measurement-result management table (for L0), which is shown on the upper side of FIG. 13 (step S22).

On the other hand, in the case of the focus jump to the L1 layer in the judgment in the step S22 (the step S21: L1), the pointer for tilt information management which is provided for the microcomputer 140 is changed to a value for indicating the measurement-result management table (for L1), which is shown on the lower side of FIG. 13 (the step S24).

On the measurement-result management table shown in FIG. 13, the result obtained by the disc profile measurement shown in FIG. 7 is totalized for each of the L0 layer and the L1 layer, and is further stored for each measurement point. Such a table is logically constructed as one area of the memory 141 for storing a correction value shown in FIG. 1, for example. Alternatively, this table may be constructed in another memory, inside or outside the microcomputer 140.

Next, if the amount of tilt is changed by that the pointer for tilt information management is changed (normally, the amount of tilt is changed because the amount of tilt is not constant in the L0 layer and the L1 layer), the tilt correction device 111 is driven to make an appropriate tilt correction value, by referring to the measurement-result management table (for L0 or L1) (step S23). In the above manner, the amount of tilt is changed after the focus jump.

As described above, according to the second embodiment, the measurement-result management table which is divided into two for each layer is provided, as shown in FIG. 13. Moreover, the pointer for pointing the measurement-result management table is prepared. In the focus jump, the amount of tilt (or the corresponding tilt correction value) on the table is referred to from this pointer. Particularly, at each time of focus jump (layer jump), the reference target of this pointer is changed to the one for indicating the measurement-result management table for the layer which is the target of the jump. Thus, on software, it is possible to refer to information as for the amount of tilt or the disc file in the two recording layers of the L0 layer and the L1 layer, excellently, which is extremely useful in practice.

Third Embodiment

Figure 14A:
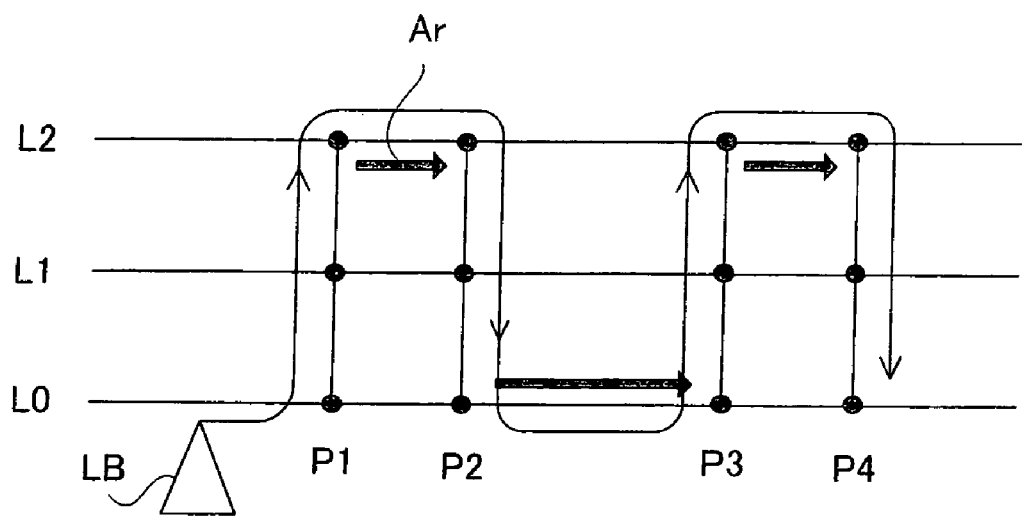
FIG. 14A and FIG. 14B are a schematic cross sectional view of the optical disc showing a measurement procedure in a disc profile measurement in a third embodiment in association with the cross section of the optical disc extending in the radial direction (FIG. 14A) and a schematic cross sectional view having the same point in a modified example (FIG. 14B).
Figure 14B:
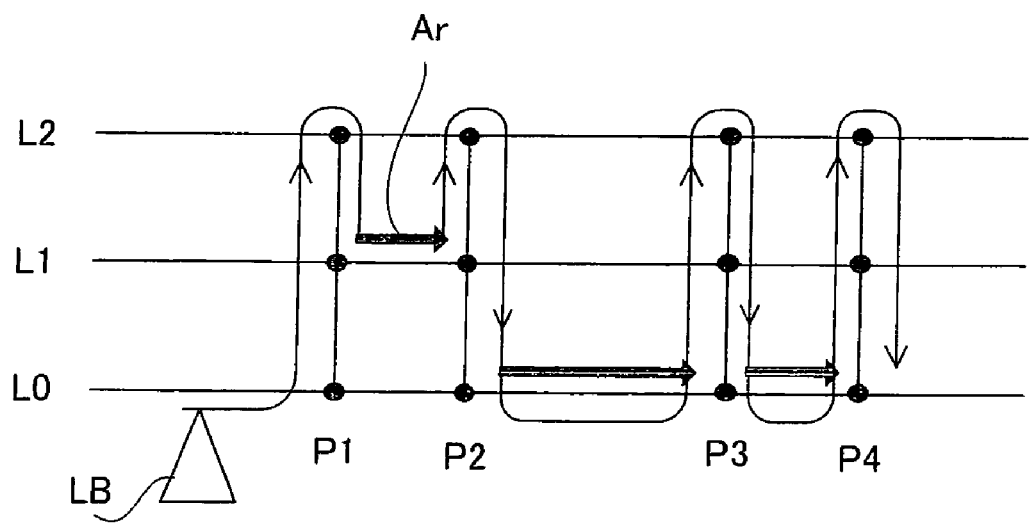

Next, with reference to FIG. 14A and FIG. 14B, an information recording/reproducing apparatus in the third embodiment of the present invention will be explained. FIG. 14A is a schematic cross sectional view of the optical disc showing a measurement procedure in the disc profile measurement in the third embodiment in association with the cross section of the optical disc extending in the radial direction. FIG. 14B is a schematic cross sectional view of the optical disc showing a measurement procedure in the disc profile measurement in a modified example of the third embodiment in association with the cross section of the optical disc extending in the radial direction.

The structure and the operation in the third embodiment are substantially the same as those in the above-mentioned first embodiment. Particularly in the third embodiment, as the optical disc 200, a three-layer disc is used for the recording or reproduction, instead of the two-layer disc. Hereinafter, this point, which is different from the first embodiment, will be explained.

As shown in FIG. 14A, while the layer jump is performed twice by the focus driving apparatus at the first measurement point P1, the tilt detection is performed for a L0 layer, a L1 layer, and a L2 layer in this order. After this is completed, the focus position of the laser light LB is displaced to the second measurement point P2 on the L2 layer by the radial direction driving apparatus, as shown in an arrow Ar in a thick line in FIG. 14A. Then, while the layer jump is performed twice, the tilt detection is performed for the L2 layer, the L1 layer, and the L0 layer in this order. After this is completed, the focus position of the laser light LB is displaced to the third measurement point P3 on the L0 layer by the radial direction driving apparatus, as shown in an arrow Ar in a thick line in FIG. 14A. Then, while the layer jump is performed twice, the tilt detection is performed for the L0 layer, the L1 layer, and the L2 layer in this order. After this is completed, the focus position of the laser light LB is displaced to the fourth measurement point P4 on the L2 layer by the radial direction driving apparatus, as shown in an arrow Ar in a thick line in FIG. 14A. Then, while the layer jump is performed twice, the tilt detection is performed for the L2 layer, the L1 layer, and the L0 layer in this order. Incidentally, in FIG. 14A, a series of displacement of the focus position of the laser light LB is shown by an arrow including the arrows Ar in thick lines.

Therefore, according to the third embodiment, even in the case of the three-layer disc, as in the first embodiment, the focus jump is performed at each measurement point, to thereby reduce the displacement distance in the radial direction and reduce the number of times of displacement in the radial direction, remarkably. Moreover, as a whole, it is possible to perform the disc profile measurement for each of the L0 layer, the L1 layer, and the L2 layer, accurately and quickly.

As shown as the modified example of the third embodiment in FIG. 14B, after the tilt detection for the L0 layer, the L1 layer, and the L2 layer is completed at one measurement point, the radial direction displacement to the next measurement point may be performed after the layer jump to a recording layer other than the recording layer related to the tilt detection performed at last. Alternatively, with respect to the order of the tilt detection for the L0 layer, the L1 layer, and the L2 layer at one measurement point, it does not always have to be one direction from the top to the bottom or from the bottom to the top in FIG. 14B. The layer jump may be performed arbitrarily at the same measurement point, to thereby perform the tilt detection for three layers in the arbitrary measuring order. The measurement in the arbitrary order can result in the disc profile for each layer, by totalizing the result for each layer and for each measurement point. Moreover, by the displacement in the radial direction after the tilt amount is detected at the same measurement point in all the L0 layer, the L1 layer, and the L2 layer, the number of times of displacement and the distance in the radial direction can be reduced more or less, as compared to the related art and the comparison example shown in FIG. 9 and FIG. 11. Thus, it is possible to properly obtain an advantage for the reduction of time related to the detection of the amount of tilt and the disc profile measurement.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2004-193432 filed on Jun. 30, 2004 including the specification, claims, drawings and summary is incorporated herein by reference in its entirety.

What is claimed is:

1. A tilt detecting apparatus for performing tilt detection of an information recording medium, in which a plurality of recording layers are laminated and which has a disc shape, in an information reproducing apparatus, an information recording apparatus, or an information recording/reproducing apparatus, which can perform at least one of reproduction and recording of record information as for each of the recording layers, by irradiating the information recording medium with laser light, said tilt detecting apparatus comprising:

a first changing device for changing a focus position of the laser light in a lamination direction of the recording layers;

a second changing device for changing the focus position in a radial direction of the information recording medium;

a tilt detecting device for detecting an amount of tilt of the information recording medium with respect to the laser light, on the basis of a photo-detection signal of light from the information recording medium caused by the laser light; and a controlling device for (i) controlling said first changing device to set the focus position onto one recording layer out of the recording layers, controlling said second changing device to displace the focus position to a j-th radial direction position (wherein j is a natural number) on the information recording medium, and controlling said tilt detecting device to detect the j-th amount of tilt for the one recording layer, then, (ii) controlling said first changing device to set the focus position onto another recording layer out of the recording layers while the focus position is fixed at the j-th radial direction position and controlling said tilt detecting device to detect the j-th amount of tilt for the other recording layer, then, (iii) controlling said second changing device to displace the focus position to a j+1-th radial direction position on the information recording medium while the focus position is fixed on the other recording layer and controlling said tilt detecting device to detect the j+1-th amount of tilt for the other recording layer, and then, (iv) controlling said first changing device to set the focus position onto the one recording layer while the focus position is fixed at the j+1-th radial direction position and controlling said tilt detecting device to detect the j+1-th amount of tilt for the one recording layer.

2. The tilt detecting apparatus according to claim 1, further comprising a processing device for outputting a discrete disc profile for each of the recording layers by totalizing the detected amount of tilt for each of the recording layers.

3. The tilt detecting apparatus according to claim 1, further comprising a processing device for calculating a continuous disc profile for each of the recording layers, on the basis of a discrete disc profile for each of the recording layers, which is obtained by totalizing the detected amount of tilt for each of the recording layers.

4. The tilt detecting apparatus according to claim 1, wherein
a spiral or coaxial recording track, on which the record information is recorded and to which an address is given, is formed on each of the recording layers, and
said second changing device searches for an address corresponding to the j-th or the j+1-th radial direction position, to thereby displace the focus position to the j-th or the j+1-th radial direction position, under the control of said controlling device.

5. The tilt detecting apparatus according to claim 1, further comprising:
a management-table generating device for generating a management table onto which a disc profile for each of the recording layers is outputted, by totalizing tilt-amount information which indicates the detected amount of tilt, for each of the radial direction positions and for each of the recording layers; and
a storing device for storing the generated management table.

6. A tilt detecting apparatus for performing tilt detection of an information recording medium, in which three or more recording layers are laminated and which has a disc shape, in an information reproducing apparatus, an information recording apparatus, or an information recording/reproducing apparatus, which can perform at least one of reproduction and recording of record information as for each of the recording layers, by irradiating the information recording medium with laser light,
said tilt detecting apparatus comprising:
a first changing device for changing a focus position of the laser light in a lamination direction of the recording layers;
a second changing device for changing the focus position in a radial direction of the information recording medium;
a tilt detecting device for detecting an amount of tilt of the information recording medium with respect to the laser light, on the basis of a photo-detection signal of light from the information recording medium caused by the laser light; and
a controlling device for (i) controlling said first changing device to set the focus position onto one recording layer out of the recording layers, controlling said second changing device to displace the focus position to a j-th radial direction position (wherein j is a natural number) on the information recording medium, and controlling said tilt detecting device to detect the j-th amount of tilt for the one recording layer, then, (ii) controlling said first changing device to sequentially set the focus position onto each of other layers out of the recording layers while the focus position is fixed at the j-th radial direction position and controlling said tilt detecting device to sequentially detect the j-th amount of tilt for each of the other recording layers, then, (iii) controlling said second changing device to displace the focus position to a j+1-th radial direction position on the information recording medium while the focus position is fixed on a n-th recording layer (wherein n is the total number of the recording layers) in which the j-th amount of tilt is detected at last, out of the other recording layers, and controlling said tilt detecting device to detect the j+1-th amount of tilt for the n-th recording layer, and then, (iv) controlling said first changing device to sequentially set the focus position onto each of the recording layers other than the n-th recording layer while the focus position is fixed at the j+1-th radial direction position and controlling said tilt detecting device to sequentially detect the j+1-th amount of tilt for each of the recording layers other than the n-th recording layer.

7. The tilt detecting apparatus according to claim 6, further comprising a processing device for outputting a discrete disc profile for each of the recording layers by totalizing the detected amount of tilt for each of the recording layers.

8. The tilt detecting apparatus according to claim 6, further comprising a processing device for calculating a continuous disc profile for each of the recording layers, on the basis of a discrete disc profile for each of the recording layers, which is obtained by totalizing the detected amount of tilt for each of the recording layers.

9. The tilt detecting apparatus according to claim 6, wherein
a spiral or coaxial recording track, on which the record information is recorded and to which an address is given, is formed on each of the recording layers, and
said second changing device searches for an address corresponding to the j-th or the j+1-th radial direction position, to thereby displace the focus position to the j-th or the j+1-th radial direction position, under the control of said controlling device.

10. The tilt detecting apparatus according to claim 6, further comprising:
a management-table generating device for generating a management table onto which a disc profile for each of the recording layers is outputted, by totalizing tilt-amount information which indicates the detected amount of tilt, for each of the radial direction positions and for each of the recording layers; and
a storing device for storing the generated management table.

11. A tilt detecting method of performing tilt detection of an information recording medium, in which a plurality of recording layers are laminated and which has a disc shape, in an information reproducing apparatus, an information recording apparatus, or an information recording/reproducing apparatus, which can perform at least one of reproduction and recording of record information as for each of the recording layers, by irradiating the information recording medium with laser light, said tilt detecting method being performed on a tilt detecting apparatus comprising: a first changing device for changing a focus position of the laser light in a lamination direction of the recording layers; a second changing device for changing the focus position in a radial direction of the information recording medium; and a tilt detecting device for detecting an amount of tilt of the information recording medium with respect to the laser light, on the basis of a photo-detection signal of light from the information recording medium caused by the laser light, said tilt detecting method comprising:

a first controlling process for controlling said first changing device to set the focus position onto one recording layer out of the recording layers, controlling said second changing device to displace the focus position to a j-th radial direction position (wherein j is a natural number) on the information recording medium, and controlling said tilt detecting device to detect the j-th amount of tilt for the one recording layer;

a second controlling process, which follows said first controlling process, for controlling said first changing device to set the focus position onto another recording layer out of the recording layers while the focus position is fixed at the j-th radial direction position and controlling said tilt detecting device to detect the j-th amount of tilt for the other recording layer;

a third controlling process, which follows said second controlling process, for controlling said second changing device to displace the focus position to a j+1-th radial direction position on the information recording medium while the focus position is fixed on the other recording layer and controlling said tilt detecting device to detect the j+1-th amount of tilt for the other recording layer; and a fourth controlling process, which follows said third controlling process, for controlling said first changing device to set the focus position onto the one recording layer while the focus position is fixed at the j+1-th radial direction position and controlling said tilt detecting device to detect the j+1-th amount of tilt for the one recording layer.

12. A tilt correcting apparatus comprising:

a tilt detecting apparatus for performing tilt detection of an information recording medium, in which a plurality of recording layers are laminated and which has a disc shape, in an information reproducing apparatus, an information recording apparatus, or an information recording/reproducing apparatus, which can perform at least one of reproduction and recording of record information as for each of the recording layers, by irradiating the information recording medium with laser light, said tilt detecting apparatus comprising: a first changing device for changing a focus position of the laser light in a lamination direction of the recording layers; a second changing device for changing the focus position in a radial direction of the information recording medium; a tilt detecting device for detecting an amount of tilt of the information recording medium with respect to the laser light, on the basis of a photo-detection signal of light from the information recording medium caused by the laser light; and a controlling device for (i) controlling said first changing device to set the focus position onto one recording layer out of the recording layers, controlling said second changing device to displace the focus position to a j-th radial direction position (wherein j is a natural number) on the information recording medium, and controlling said tilt detecting device to detect the j-th amount of tilt for the one recording layer, then, (ii) controlling said first changing device to set the focus position onto another recording layer out of the recording layers while the focus position is fixed at the j-th radial direction position and controlling said tilt detecting device to detect the j-th amount of tilt for the other recording layer, then, (iii) controlling said second changing device to displace the focus position to a j+1-th radial direction position on the information recording medium while the focus position is fixed on the other recording layer and controlling said tilt detecting device to detect the j+1-th amount of tilt for the other recording layer, and then, (iv) controlling said first changing device to set the focus position onto the one recording layer while the focus position is fixed at the j+1-th radial direction position and controlling said tilt detecting device to detect the j+1-th amount of tilt for the one recording layer; and a correcting device for correcting an irradiation angle of the laser light with respect to the information recording medium, in accordance with the detected amount of tilt.

13. A tilt correcting apparatus comprising:

a tilt detecting apparatus for performing tilt detection of an information recording medium, in which three or more recording layers are laminated and which has a disc shape, in an information reproducing apparatus, an information recording apparatus, or an information recording/reproducing apparatus, which can perform at least one of reproduction and recording of record information as for each of the recording layers, by irradiating the information recording medium with laser light, said tilt detecting apparatus comprising: a first changing device for changing a focus position of the laser light in a lamination direction of the recording layers; a second changing device for changing the focus position in a radial direction of the information recording medium; a tilt detecting device for detecting an amount of tilt of the information recording medium with respect to the laser light, on the basis of a photo-detection signal of light from the information recording medium caused by the laser light; and a controlling device for (i) controlling said first changing device to set the focus position onto one recording layer out of the recording layers, controlling said second changing device to displace the focus position to a j-th radial direction position (wherein j is a natural number) on the information recording medium, and controlling said tilt detecting device to detect the j-th amount of tilt for the one recording layer, then, (ii) controlling said first changing device to sequentially set the focus position onto each of other recording layers out of the recording layers while the focus position is fixed at the j-th radial direction position and controlling said tilt detecting device to sequentially detect the j-th amount of tilt for each of the other recording layers, then, (iii) controlling said second changing device to displace the focus position to a j+1-th radial direction position on the information recording medium while the focus position is fixed on a n-th recording layer (wherein n is the total number of the recording layers) in which the j-th amount of tilt is detected at last, out of the other recording layers, and controlling said tilt detecting device to detect the j+1-th amount of tilt for the n-th recording layer, and then, (iv) controlling said first changing device to sequentially set the focus position onto each of the recording layers other than the n-th recording layer while the focus position is fixed at the j+1-th radial direction position and controlling said tilt detecting device to sequentially detect the j+1-th amount of tilt for each of the recording layers other than the n-th recording layer; and a correcting device for correcting an irradiation angle of the laser light with respect to the information recording medium, in accordance with the detected amount of tilt.

14. A tilt correcting apparatus comprising:

a tilt detecting apparatus for performing tilt detection of an information recording medium, in which a plurality of recording layers are laminated and which has a disc shape, in an information reproducing apparatus, an information recording apparatus, or an information recording/reproducing apparatus, which can perform at least one of reproduction and recording of record information as for each of the recording layers, by irradiating the information recording medium with laser light, said tilt detecting apparatus comprising: a first changing device for changing a focus position of the laser light in a lamination direction of the recording layers; a second changing device for changing the focus position in a radial direction of the information recording medium; a tilt detecting device for detecting an amount of tilt of the information recording medium with respect to the laser light, on the basis of a photo-detection signal of light from the information recording medium caused by the laser light; a controlling device for (i) controlling said first changing device to set the focus position onto one recording layer out of the recording layers, controlling said second changing device to displace the focus position to a j-th radial direction position (wherein j is a natural number) on the information recording medium, and controlling said tilt detecting device to detect the j-th amount of tilt for the one recording layer, then, (ii) controlling said first changing device to set the focus position onto another recording layer out of the recording layers while the focus position is fixed at the j-th radial direction position and controlling said tilt detecting device to detect the j-th amount of tilt for the other recording layer, then, (iii) controlling said second changing device to displace the focus position to a j+1-th radial direction position on the information recording medium while the focus position is fixed on the other recording layer and controlling said tilt detecting device to detect the j+1-th amount of tilt for the other recording layer, and then, (iv) controlling said first changing device to set the focus position onto the one recording layer while the focus position is fixed at the j+1-th radial direction position and controlling said tilt detecting device to detect the j+1-th amount of tilt for the one recording layer; a management-table generating device for generating a management table onto which a disc profile for each of the recording layers is outputted, by totalizing tilt-amount information which indicates the detected amount of tilt, for each of the radial direction positions and for each of the recording layers; and a storing device for storing the generated management table; and a correcting device for correcting an irradiation angle of the laser light with respect to the information recording medium, in accordance with the amount of tilt indicated by the tilt-amount information which is obtained by referring to the management table stored in said storing device.

15. A tilt correcting apparatus comprising:

a tilt detecting apparatus for performing tilt detection of an information recording medium, in which three or more recording layers are laminated and which has a disc shape, in an information reproducing apparatus, an information recording apparatus; or an information recording/reproducing apparatus, which can perform at least one of reproduction and recording of record information as for each of the recording layers, by irradiating the information recording medium with laser light, said tilt detecting apparatus comprising: a first changing device for changing a focus position of the laser light in a lamination direction of the recording layers; a second changing device for changing the focus position in a radial direction of the information recording medium; a tilt detecting device for detecting an amount of tilt of the information recording medium with respect to the laser light, on the basis of a photo-detection signal of light from the information recording medium caused by the laser light; a controlling device for (i) controlling said first changing device to set the focus position onto one recording layer out of the recording layers, controlling said second changing device to displace the focus position to a j-th radial direction position (wherein j is a natural number) on the information recording medium, and controlling said tilt detecting device to detect the j-th amount of tilt for the one recording layer, then, (ii) controlling said first changing device to sequentially set the focus position onto each of other recording layers out of the recording layers while the focus position is fixed at the j-th radial direction position and controlling said tilt detecting device to sequentially detect the j-th amount of tilt for each of the other recording layers, then, (iii) controlling said second changing device to displace the focus position to a j+1-th radial direction position on the information recording medium while the focus position is fixed on a n-th recording layer (wherein n is the total number of the recording layers) in which the j-th amount of tilt is detected at last, out of the other recording layers, and controlling said tilt detecting device to detect the j+1-th amount of tilt for the n-th recording layer, and then, (iv) controlling said first changing device to sequentially set the focus position onto each of the recording layers other than the n-th recording layer while the focus position is fixed at the j+1-th radial direction position and controlling said tilt detecting device to sequentially detect the j+1-th amount of tilt for each of the recording layers other than the n-th recording layer; a management-table generating device for generating a management table onto which a disc profile for each of the recording layers is outputted, by totalizing tilt-amount information which indicates the detected amount of tilt, for each of the radial direction positions and for each of the recording layers; and a storing device for storing the generated management table; and a correcting device for correcting an irradiation angle of the laser light with respect to the information recording medium, in accordance with the amount of tilt indicated by the tilt-amount information which is obtained by referring to the management table stored in said storing device.

16. An information recording/reproducing apparatus comprising:

(I) a tilt correcting apparatus comprising:

a tilt detecting apparatus for performing tilt detection of an information recording medium, in which a plurality of recording layers are laminated and which has a disc shape, in an information reproducing apparatus, an information recording apparatus, or an information recording/reproducing apparatus, which can perform at least one of reproduction and recording of record information as for each of the recording layers, by irradiating the information recording medium with laser light, said tilt detecting apparatus comprising: a first changing device for changing a focus position of the laser light in a lamination direction of the recording layers; a second changing device for changing the focus position in a radial direction of the information recording medium; a tilt detecting device for detecting an amount of tilt of the information recording medium with respect to the laser light, on the basis of a photo-detection signal of light from the information recording medium caused by the laser light; and a controlling device for (i) controlling said first changing device to set the focus position onto one recording layer out of the recording layers, controlling said second changing device to displace the focus position to a j-th radial direction position (wherein j is a natural number) on the information recording medium, and controlling said tilt detecting device to detect the j-th amount of tilt for the one recording layer, then, (ii) controlling said first changing device to set the focus position onto another recording layer out of the recording layers while the focus position is fixed at the j-th radial direction position and controlling said tilt detecting device to detect the j-th amount of tilt for the other recording layer, then, (iii) controlling said second changing device to displace the focus position to a j+1-th radial direction position on the information recording medium while the focus position is fixed on the other recording layer and controlling said tilt detecting device to detect the j+1-th amount of tilt for the other recording layer, and then, (iv) controlling said first changing device to set the focus position onto the one recording layer while the focus position is fixed at the j+1-th radial direction position and controlling said tilt detecting device to detect the j+1-th amount of tilt for the one recording layer; and a correcting device for correcting an irradiation angle of the laser light with respect to the information recording medium, in accordance with the detected amount of tilt; and (II) an optical writing/reading device which has an emitting device for emitting the laser light and which selectively writes the record information onto or reads the record information from the information recording medium by using the laser light.

17. An information recording/reproducing apparatus comprising:

(I) a tilt correcting apparatus comprising:

a tilt detecting apparatus for performing tilt detection of an information recording medium, in which three or more recording layers are laminated and which has a disc shape, in an information reproducing apparatus, an information recording apparatus, or an information recording/reproducing apparatus, which can perform at least one of reproduction and recording of record information as for each of the recording layers, by irradiating the information recording medium with laser light, said tilt detecting apparatus comprising: a first changing device for changing a focus position of the laser light in a lamination direction of the recording layers; a second changing device for changing the focus position in a radial direction of the information recording medium; a tilt detecting device for detecting an amount of tilt of the information recording medium with respect to the laser light, on the basis of a photo-detection signal of light from the information recording medium caused by the laser light; and a controlling device for (i) controlling said first changing device to set the focus position onto one recording layer out of the recording layers, controlling said second changing device to displace the focus position to a j-th radial direction position (wherein j is a natural number) on the information recording medium, and controlling said tilt detecting device to detect the j-th amount of tilt for the one recording layer, then, (ii) controlling said first changing device to sequentially set the focus position onto each of other recording layers out of the recording layers while the focus position is fixed at the j-th radial direction position and controlling said tilt detecting device to sequentially detect the j-th amount of tilt for each of the other recording layers, then, (iii) controlling said second changing device to displace the focus position to a j+1-th radial direction position on the information recording medium while the focus position is fixed on a n-th recording layer (wherein n is the total number of the recording layers) in which the j-th amount of tilt is detected at last, out of the other recording layers, and controlling said tilt detecting device to detect the j+1-th amount of tilt for the n-th recording layer, and then, (iv) controlling said first changing device to sequentially set the focus position onto each of the recording layers other than the n-th recording layer while the focus position is fixed at the j+1-th radial direction position and controlling said tilt detecting device to sequentially detect the j+1-th amount of tilt for each of the recording layers other than the n-th recording layer; and a correcting device for correcting an irradiation angle of the laser light with respect to the information recording medium, in accordance with the detected amount of tilt; and (II) an optical writing/reading device which has an emitting device for emitting the laser light and which selectively writes the record information onto or reads the record information from the information recording medium by using the laser light.

* * * * *